US008150587B2

(12) United States Patent
Tomoda et al.

(10) Patent No.: US 8,150,587 B2
(45) Date of Patent: Apr. 3, 2012

(54) SHIFT CONTROL DEVICE OF TRANSMISSION

(75) Inventors: Ahihiko Tomoda, Wako (JP); Kanau Iwashita, Wako (JP); Yoshihisa Ieda, Wako (JP); Koshi Hayakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 444 days.

(21) Appl. No.: 12/394,802

(22) Filed: Feb. 27, 2009

(65) Prior Publication Data

US 2009/0222182 A1    Sep. 3, 2009

(30) Foreign Application Priority Data

Feb. 29, 2008    (JP) .................................. 2008-051141

(51) Int. Cl.
*G06F 7/00*      (2006.01)
*G06F 17/00*     (2006.01)

(52) U.S. Cl. ................. 701/64; 701/51; 701/67; 701/70; 701/77; 701/83; 701/337.5

(58) Field of Classification Search .................... 701/51, 701/64, 67; 477/70, 77, 83; 74/337.5
See application file for complete search history.

(56) References Cited

U.S. PATENT DOCUMENTS

| | | | | |
|---|---|---|---|---|
| 5,002,166 A | * | 3/1991 | Leigh-Monstevens et al. | 477/83 |
| 5,017,916 A | * | 5/1991 | Londt et al. | 340/870.13 |
| 5,047,936 A | * | 9/1991 | Ishii et al. | 701/64 |
| 5,911,787 A | * | 6/1999 | Walker | 74/335 |
| 6,684,144 B2 | * | 1/2004 | Sekii et al. | 701/51 |
| 6,832,147 B2 | * | 12/2004 | Vornehm et al. | 701/54 |
| 7,752,936 B2 | * | 7/2010 | Kobayashi et al. | 74/337.5 |
| 7,891,262 B2 | * | 2/2011 | Hayakawa et al. | 74/337.5 |
| 2002/0007241 A1 | * | 1/2002 | Kupper et al. | 701/51 |
| 2006/0293823 A1 | * | 12/2006 | Miyamaru et al. | 701/51 |
| 2007/0227284 A1 | * | 10/2007 | Takemoto et al. | 74/337.5 |
| 2008/0220936 A1 | * | 9/2008 | Kobayashi et al. | 477/70 |
| 2009/0143949 A1 | * | 6/2009 | Fukaya et al. | 701/67 |
| 2010/0185371 A1 | * | 7/2010 | Tomoda | 701/67 |

FOREIGN PATENT DOCUMENTS

JP    2003-341376 A    12/2003

* cited by examiner

*Primary Examiner* — Kaitlin Joerger
*Assistant Examiner* — Prasad Gokhale
(74) *Attorney, Agent, or Firm* — Westerman, Hattori, Daniels & Adrian, LLP

(57) ABSTRACT

An ECU is configured to disengage a clutch by driving a motor upon detection of starting of a shift operation, and to engage the clutch upon detection of completion of the shift change. The shift operation starting detection is detected upon determination that an operational force given to a shift pedal is equal to or more than a predetermined operational force, and the shift change completion detection is detected upon determination that a rotational angle of a shift drum from a shift gear position before a shift gear operation becomes equal to or more than a first predetermined angle. The shift operation starting detection is also detected upon determination that the rotational angle of the shift drum from a shift gear position before a shift gear operation is a second predetermined angle or more which is smaller than the first predetermined angle.

18 Claims, 13 Drawing Sheets

SHIFT CONTROL DEVICE OF TRANSMISSION

TECHNICAL FIELD

The present invention relates to a shift control device of a transmission and more particularly to a shift control device of a transmission which can enhance reliability of a shift change and feeling and drivability of a shift operation.

BACKGROUND OF THE INVENTION

Conventionally, in a sequential transmission which uses a shift drum, there has been known the constitution which can perform an automatic transmission control or a semi-automatic transmission control by driving a clutch or a shift drum using an actuator.

JP-A-2003-341376 discloses the sequential transmission of a motorcycle by performing a shift change due to driving of actuators for a clutch and a shift drum by manipulating shift switches mounted on a handle.

SUMMARY OF THE INVENTION

On the other hand, there has been also known a transmission in which a shift drum is rotated by an operational force which a driver gives to a shift pedal although the engagement and disengagement of the clutch are performed by an actuator. In such a transmission, different from the constitution disclosed in JP-A-2003-341376 in which two actuators are automatically driven based on an operation of a shift switch, to enhance the reliability of the shift change and feeling of the shift operation, in addition to interlocking of an operation of the shift pedal and the clutch control, various kinds of controls which are executed at the time of performing the shift change operation must be uniquely designed respectively.

Accordingly, it is an object of the present invention to provide a shift control device of a transmission which can overcome the above-mentioned drawbacks of the related art and can enhance the reliability of the shift change, feeling of a shift operation and drivability.

To achieve the above-mentioned object, according to a first technical feature of the present invention, there is provided a shift control device of a transmission which changes a shift gear position by intermittently rotating a shift drum in response to an operation of a shift pedal, wherein the shift control device includes: a clutch which disengages or engages a drive force transmitted to a drive wheel from an engine; an actuator which generates power for engaging or disengaging the clutch; a control means which controls the actuator; a shift operation starting detection means which detects starting of a shift operation in response to the operation of the shift pedal; and a shift change completion detection means which detects the completion of a shift change by the shift operation, wherein the control means is disengages the clutch by driving the actuator upon detection of starting of the shift operation by the shift operation starting detection means, and engages the clutch by driving the actuator upon detection of completion of a shift change by the shift change completion detection means.

Further, according to the second technical feature of the present invention, the above-mentioned shift control device of a transmission further includes: an operational force detection means which detects an operational force of the shift pedal; and a rotational angle detection means which detects a rotational angle of the shift drum, wherein the shift operation starting detection means detects starting of the shift operation upon determination that the operational force on the shift pedal which is detected by the operational force detection means is equal to or more than a predetermined operational force, and the shift change completion detection means detects the completion of the shift change upon determination that the rotational angle of the shift drum from a shift gear position before a shift gear operation which detects by the rotational angle detection means is a first predetermined angle or more.

Further, according to the third technical feature of the present invention, the above-mentioned shift operation starting detection means detects the starting of the shift operation also upon determination that the rotational angle of the shift drum from the shift gear position before shift gear operation is a second predetermined angle or more which is smaller than the first predetermined angle.

Further, according to the fourth technical feature of the present invention, the above-mentioned control means further comprises an engine control means for controlling an output of the engine, and the engine control means disengages the clutch and transfers the clutch state to a first shift control state, where the output of the engine is approximately zero, upon detection of the starting of the shift operation; disengages the clutch and transfers the clutch state to a second shift control state, where the output of the engine is equal to or less than a usual level, with a lapse of a predetermined time from the transition of the clutch state to the first shift control state; and engages the clutch and transfers the clutch state into a usual control state, where the output of the engine is usual, upon detection of the completion of the shift change with the clutch state in the first shift control state or in the second shift control state.

Further, according to the fifth technical feature of the present invention, the shift control device also includes a shift pedal operation quantity detection means which detects an operation quantity of the shift pedal, the usual control state is constituted of a first usual control state where the clutch state cannot transfer to the first shift control state and a second usual control state where the clutch state can transfer to the first shift control state, and the control means transfers the clutch state to the first usual control state upon detection of the completion of the shift change when the clutch state is in the first shift control state or in the second shift control state, and transfers the clutch state to the second usual control state upon determination that an operation quantity of the shift pedal becomes equal to or less than a predetermined operation quantity when the clutch state is in the first usual control state.

Further, according to the sixth technical feature of the present invention, the shift control device further comprises a lost motion mechanism which is arranged between a shift spindle connected to the shift pedal and the shift drum for connecting the shift spindle and the shift drum by way of a resilient member, and an operational force applied to the shift pedal is detected based on an operation quantity of the lost motion mechanism.

According to the first technical feature of the present invention, the control means is configured to disengage the clutch by driving the actuator upon detection of starting of the shift operation by the shift operation starting detection means, and is configured to engage the clutch by driving the actuator upon detection of completion of the shift change by the shift change completion detection means and hence, it is possible to provide the shift control device of a transmission in which the clutch is automatically disengaged by the operation of the shift pedal and, at the same time, the clutch is automatically engaged after completion of the shift change. Further, since the shift operation is performed manually, a rider can reduce a clutch operation burden while maintaining manual operation feeling.

According to the second technical feature of the present invention, the above-mentioned shift control device of a transmission further comprises: an operational force detection means which detects an operational force of the shift pedal; and a rotational angle detection means which detects a rotational angle of the shift drum, wherein the shift operation starting detection means is configured to detect starting of the shift operation upon determination that the operational force or the shift pedal which is detected by the operational force detection means becomes equal to or more than a predetermined operational force, and the shift change completion detection means is configured to detect the completion of the shift change upon determination that the rotational angle of the shift drum from a shift gear position before a shift gear operation which is detected by the rotational angle detection means becomes a first predetermined angle or more. Accordingly, the shift control device can execute the clutch control by surely detecting the starting of the shift operation and the completion of the shift change based on numerical values.

According to the third technical feature of the present invention, the shift operation starting detection means is configured to detect the starting of the shift operation also upon determination that the rotational angle of the shift drum from the shift gear position before shift gear operation becomes a second predetermined angle or more which is smaller than the first predetermined angle. Accordingly, in a case that the rotational drive force of the engine is small or the like, although the clutch is not disengaged, when the shift pedal is operated in a state that the shift drum is rotatable, the shift control device can execute the proper clutch control by detecting the starting of the shift operation based on the rotational angle of the shift drum.

According to the fourth technical feature of the present invention, the control means further comprises the engine control means for controlling the output of the engine, and the engine control means disengages the clutch and transfers the clutch state to the first shift control state where the output of the engine is approximately zero upon detection of the starting of the shift operation; disengages the clutch and transfers the clutch state to a second shift control state, where the output of the engine is equal to or less than the usual level, with a lapse of the predetermined time from the transition of the clutch state to the first shift control state; and engages the clutch and transfers the clutch state to the usual control state, where the output of the engine is usual, upon detection of the completion of the shift change when the clutch state is in the first shift control state or in the second shift control state. Accordingly, by executing the control which limits the engine output, the shift change can be smoothly performed, thus enhancing the shift feeling and the drivability. To be more specific, when the starting of the shift operation is detected, first of all, the engine output is set to approximately zero thus making the release of engagement of dog clutches between the speed change gears easy and, subsequently, by setting the engine output to the usual value or less, it is possible to prevent the elevation of the engine rotational speed during disengagement of the clutch. Further, it is possible to smoothly return the engine output to the usual output along with the engagement of the clutch.

According to the fifth technical feature of the present invention, the shift control device further comprises the shift pedal operation quantity detection means which detects the operation quantity of the shift pedal, the usual control state is constituted of the first usual control state where the clutch state cannot transfer to the first shift control state and the second usual control state where the clutch state can transfer to the first shift control state, and the control means transfers the clutch state to the first usual control state upon detection of completion of the shift change when the clutch state is in the first shift control state or in the second shift control state, and transfers the clutch state to the second usual control state upon determination that an operation quantity of the shift pedal becomes equal to or less than the predetermined operation quantity when the clutch state is in the first usual control state. Accordingly, for example, by setting the predetermined operation quantity to the small value, after completion of the shift change, the next shift operation cannot be performed unless the shift pedal returns to a position close to the initial position before the shift operation and hence, it is possible to surely perform the shift change which follows an intention of a driver who wants to perform the gear change.

According to the sixth technical feature of the present invention, the shift control device further comprises the lost motion mechanism which is arranged between the shift spindle connected to the shift pedal and the shift drum for connecting the shift spindle and the shift drum by way of the resilient member, and the operational force applied to the shift pedal is detected based on the operation quantity of the lost motion mechanism. Accordingly, by detecting the rotational quantity of the shift spindle and the rotational quantity of the shift drum respectively using potentiometers or the like without using particular equipment such as a sensor which can detect a torsional torque, it is possible to perform the estimation detection of the operational force imparted to the shift pedal.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
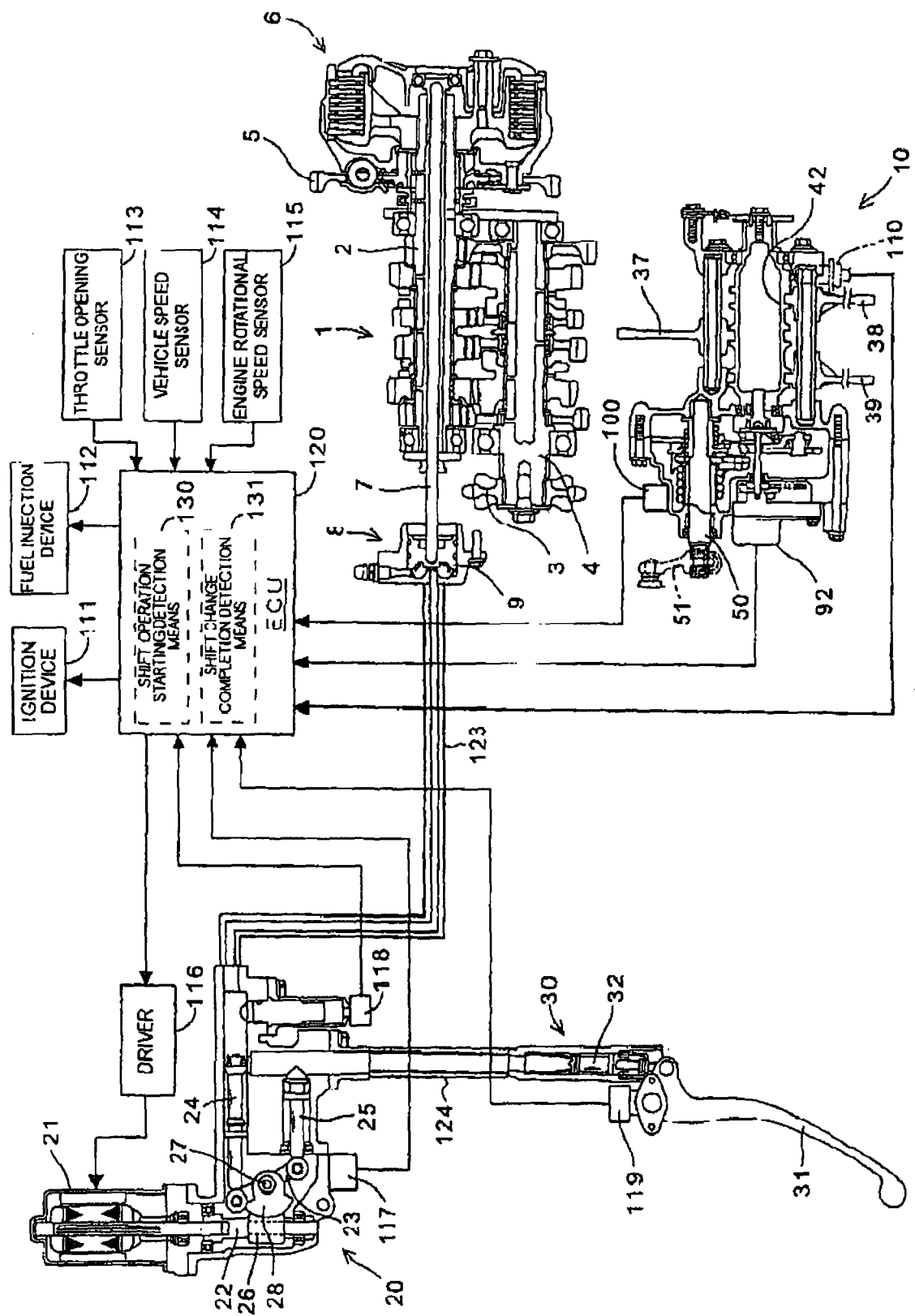
FIG. 1 is a block diagram showing the constitution of a shift control device of a transmission according to one embodiment of the present invention and peripheral equipment of the shift control device.

A preferred embodiment of the present invention is explained in detail hereinafter in conjunction with drawings. FIG. 1 is a block diagram showing the constitution of a shift control device of a transmission according to one embodiment of the present invention and peripheral equipment of the shift control device. The transmission 1 which is applied to a motorcycle is configured such that, a main shaft 2 which constitutes an input shaft and a counter shaft 4 which constitutes an output shaft are rotatably supported on an engine case (not shown in the drawing) in a state that the axes of main shaft 2 and the counter shaft 4 are arranged parallel to each other, and between the main shaft 2 and the counter shaft 4, speed change gear pairs for first speed to sixth speed for transmitting a rotational drive force are provided. Here, the constant-mesh transmission 1 which sequentially changes over the speed change gear pairs by intermittently rotating a shift drum has the well-known general constitution as a sequential multi-position transmission for a motorcycle and hence, the detailed explanation of the transmission 1 is omitted.

Between the main shaft 2 of the transmission 1 and a crankshaft (not shown in the drawing) of an engine which constitutes a power source, a clutch 6 which changes the engagement/disengagement state of a rotational drive force of the engine is provided. The rotational drive force of the engine is transmitted to the main shaft 2 from a primary driven gear 5 which is meshed with a primary drive gear (not shown in the drawing) which is fixed to the crankshaft by way of the clutch 6. The rotational drive force which is transmitted to the main shaft 2 is transmitted to the counter shaft 4 by way of one speed change gear pair selected by a speed change mechanism 10 described later. A drive sprocket wheel 3 is fixed to one end portion of the counter shaft 4, and the rotational drive force of the engine is transmitted to a rear wheel (not shown in the drawing) which constitutes a drive wheel by way of a drive chain (not shown in the drawing) which is wrapped around the drive sprocket wheel 3.

The clutch 6 is constituted of a clutch outer which is fixed to the primary driven gear 5 and holds a plurality of drive friction plates and a clutch inner which holds driven friction plates which are brought into contact with the drive friction plates so as to generate a friction force between the drive friction plates and the driven friction plates. The clutch inner is constantly pushed in the left direction in the drawing due to a resilient repulsive force of a clutch spring, and due to such a pushing force, the friction force necessary for the transmission of the rotational drive force of the engine is generated between the drive friction plates and the driven friction plates.

Further, the clutch inner is configured to be movable in the axial direction by allowing a push rod 7 which penetrates the main shaft 2 to slide. Due to such constitution, the clutch 6 is held in an engagement state when the push rod 7 is not allowed to slide, while when the push rod 7 is moved in the right direction in the drawing by being pushed with a force which resists a resilient repulsive force of the clutch spring, the clutch inner is moved in the direction that the drive friction plates and the driven friction plates are separated from each other and hence, the clutch 6 is moved in the disengaging direction. Here, by adjusting the pushing force applied to the push rod 7, it is also possible to acquire a semi-clutch state between the engagement state and the disengagement state. The push rod 7 is brought into contact with an end portion of a hydraulic piston 9 of a clutch slave cylinder 8 which is fixed to the engine case. By supplying a predetermined oil pressure to an oil passage 123, the hydraulic piston 9 pushes the push rod 7 in the right direction in the drawing.

The speed change mechanism 10 which selects one gear train for transmitting the rotational drive force is housed in the inside of the engine case in the same manner as the transmission 1. The speed change mechanism 10 is provided for executing a shift gear operation, wherein when a rider operates a shift pedal (not shown in the drawing) tiltably mounted on a vehicle body of the motorcycle, a shift drum 42 is rotated by an operational force imparted at the time of the shift operation, thus enabling the shift gear operation. In this embodiment, the shift pedal which the rider operates with his/her left leg is connected to a shift lever 51 fixed to one end portion of a shift spindle 50.

In a surface of the hollow cylindrical shift drum 42, three engaging grooves with which one end sides of the first to third shift forks 37, 38, 39 are respectively engaged are formed. Further, the other end sides of the first to third shift forks 37 to 39 are respectively engaged with three slidable speed change gears which are slidably mounted on the main shaft 2 and the counter shaft 4 in the axial direction. When the shift drum 42 is rotated, the first to third shift forks 37 to 39 are slid to predetermined positions in the axial direction corresponding to the respective change gear positions and hence, the engagement/disengagement states of dog clutches which are arranged between the slidable speed change gears and the speed change gears arranged adjacent to the slidable speed change gears are changed over. Accordingly, the speed change gear pair which transmits the rotational drive force of the engine is selectively changed over so that the shift gear operation is executed. Here, the above-mentioned dog clutch is a well-known general mechanism which performs the transmission of the rotational drive force between the neighboring gears on the same axis by allowing a plurality of dog teeth and dog holes to be meshed with each other in the axial direction.

The speed change mechanism 10 includes a gear position sensor 92 which constitutes a rotary angle detection means for detecting a rotational angle of the shift drum 42, a neutral switch 110 which is turned on when the shift drum 42 is at a neutral position and detects a neutral state of the transmission 1, and a shift spindle rotational quantity sensor 100 which detects a rotational quantity of the shift spindle 50. Here, with the use of the gear position sensor 92, it is possible to detect the shift gear position of the transmission 1 based on a rotational angle (rotational quantity) of the shift drum.

A hydraulic modulator 20 which supplies an oil pressure to the clutch slave cylinder 8 is driven by a motor 21 which constitutes an actuator. When the motor 21 is driven based on a drive signal from a driver 116, a worm gear 26 which is engaged with a rotary shaft 22 is rotated. A worm wheel 28 which is rotated about a tilting shaft 27 is meshed with the worm gear 26 and one end of the worm wheel 28 is brought into contact with a tilting member 23 which is tiltable about the tilting shaft 27 and is rotated, and a roller mounted on one end portion of the tilting member 23 is brought into contact with a first hydraulic piston 24. Due to such constitution, when the motor 21 is rotatably driven in the predetermined direction, one end portion of the tilting member 23 pushes the first hydraulic piston 24 and hence, it is possible to generate an oil pressure in the oil passage 123.

On the other hand, in this embodiment, a clutch master cylinder 30 which a rider operates with his/her left hand is mounted on a left-side handle (not shown in the drawing) of the motorcycle. The clutch master cylinder 30 is configured to generate an oil pressure in an oil passage 124 due to pushing of a hydraulic piston 32 when the rider grasps a clutch lever 31. The oil passage 124 is connected to the hydraulic modulator 20 and is configured to push the second hydraulic piston 25 which is mounted in the inside of the hydraulic modulator 20 when a predetermined oil pressure is generated in the oil passage 124. One end portion of the second hydraulic piston 25 is arranged to be in contact with roller on another end side of the above-mentioned tilting member 23. The tilting member 23 is configured to be tilted separately and independently from the worm wheel 28 so as to push the first hydraulic piston 24. Due to such constitution, when the second hydraulic piston 25 is pushed, irrespective of an operation state of the motor 21, the first hydraulic piston 24 is pushed and hence, an oil pressure can be generated in the oil passage 123 taking precedence over the operation by the rider.

The hydraulic modulator 20 includes a tilting member rotational quantity sensor 117 which detects a rotational quantity of the tilting member 23, and an oil pressure sensor 118 which detects an oil pressure generated in the oil passage 123. Further, the clutch master cylinder 30 includes a clutch operation quantity sensor 119 which detects an operation quantity of the clutch lever 31.

To an ECU 120 which constitutes a control means, signals from a throttle opening sensor 113 which detects throttle opening interlocked with a throttle operation of a rider, a vehicle speed sensor 114 which detects a vehicle speed of the motorcycle, and an engine rotational speed sensor 115 which detects an engine rotational speed are respectively inputted. Further, to the ECU 120, signals from a shift spindle rotational quantity sensor 100 constituting a shift pedal operation quantity detection means, a gear position sensor 92 and a neutral switch 110 which are mounted on the speed change mechanism 10 and signals from the tilting member rotational quantity sensor 117 and the oil pressure sensor 118 which are mounted on the hydraulic modulator 20 are respectively inputted. The ECU 120 performs respective drive controls of an ignition device 111, a fuel injection device 112 and the driver 116 in response to the signals from the above-mentioned respective sensors.

The ECU 120 includes a shift operation starting detection means 130 which detects starting of the shift operation by the rider and a shift change completion detection means 131 which detects the completion of the shift gear operation by the shift operation. The ECU 120 is configured to supply a drive signal to the driver 116 based on these detection states and to automatically execute the engagement and disengagement of the clutch 6.

Due to the above-mentioned constitution, the rotational operation of the shift drum can be performed using an operational force of the rider and, at the same time, only engagement/disengagement of the clutch can be automatically controlled and hence, the manual shift operation which requires no clutch operation can be realized. Accordingly, different from the automatic transmission which also executes the rotational operation of the shift drum using a motor, it is possible to allow the rider to have an operation feeling that the rider actually rotates the shift drum using the shift pedal.

Figure 2:
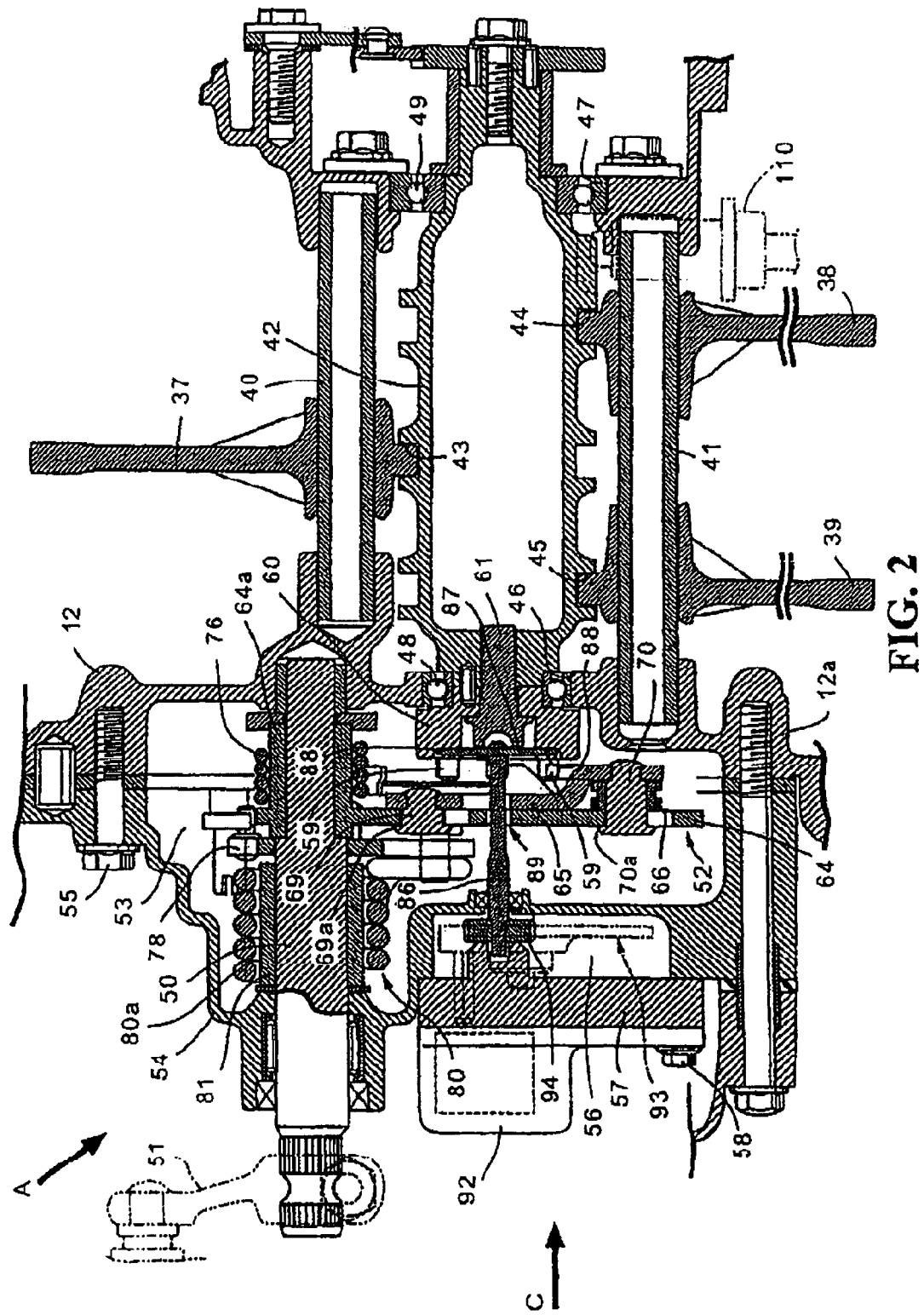
FIG. 2 is an enlarged cross-sectional view (cross-sectional view taken along a line B-B in FIG. 4) of a speed change mechanism.

FIG. 2 is an enlarged cross-sectional view of the speed change mechanism 10. FIG. 2 is also a cross-sectional view taken along a line B-B in FIG. 4. On an engine case 12, the shift drum 42 having an axis parallel to axes of the first and second shift fork shafts 40, 41 is rotatably supported. The first to third shift forks 37, 38, 39 are respectively engaged with three engaging grooves 43, 44, 45 formed in an outer surface of the shift drum 42. The first shift fork 37 is supported on the first shift fork shaft 40 which is supported on the engine case 12 with an axis parallel to the axes of the main shaft 2 and the counter shaft 4 in a state that the first shift fork 37 is axially slidable. Further, the second and third shift forks 38, 39 are supported on the second shift fork shaft 41 which is supported parallel to the first shift fork shaft 40 in a state that the second and third shift forks 38, 39 are axially slidable.

The engaging grooves 43 to 45 of the shift drum 42 are formed so as to determine positions of the first to third shift forks 37 to 39 on the first and second shift fork shafts 40, 41 corresponding to the rotational position of the shift drum 42. Further, due to the rotation of the shift drum 42, one speed change gear pair which transmits a rotational drive force corresponding to the rotational position is selected. Here, rotational angles of the shift drum 42 between the respective shift gear positions are set to 60 degrees so that the shift drum 42 performs the intermittent rotation for every 60 degrees at the time of shift gear operation.

Both ends of the shift drum 42 rotatably penetrate bearing holes 46, 47 formed in the engine case 12, and ball bearings 48, 49 are interposed between inner peripheries of the bearing holes 46, 47 and the shift drum 42. The shift drum 42 is rotatably driven by a shift mechanism 52 which is operated corresponding to the rotation of the shift spindle 50 in response to the shift operation. A shift lever 51, which is connected with the shift pedal (not shown in the drawing) is fixed to one end portion of the shift spindle 50 having an axis parallel to the shift drum 42.

A shift cam 60 which mounts six driven pins 59, the number of which corresponds to the number of shift gear positions thereon, is coaxially fixed to the end of the shift drum 42 using a bolt 61 in a state that the shift cam 60 faces an operation chamber 53. The shift mechanism 52, which is arranged to cover one end portion of the shift drum 42 and the shift cam 60, is configured to be rotated by being engaged with one of the respective driven pins 59 so as to rotatably drive the shift drum 42.

Figure 3:
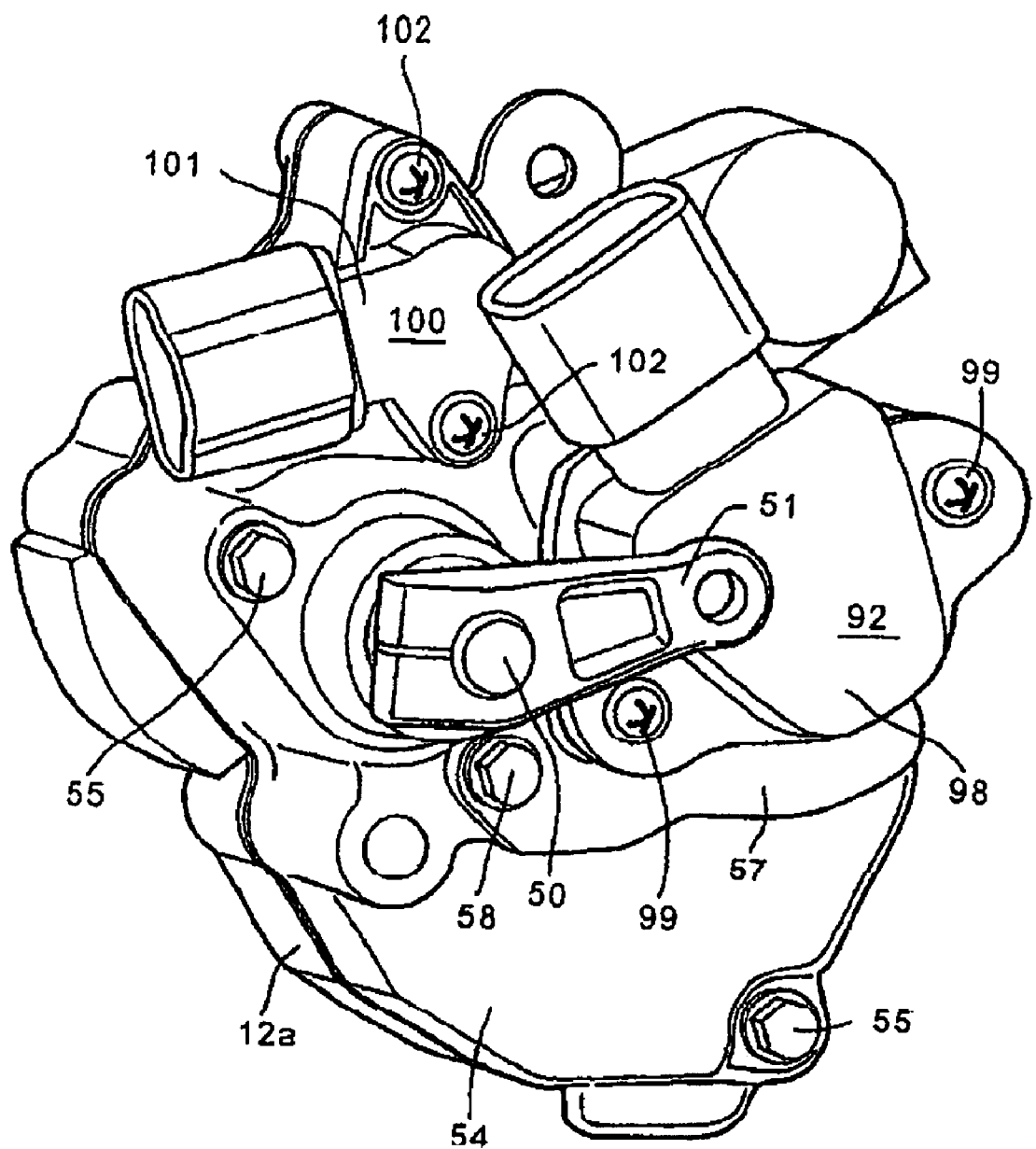
FIG. 3 is a perspective view of the speed change mechanism as viewed in the direction A in FIG. 2.

The shift control device of a transmission is further explained also in conjunction with FIG. 3. FIG. 3 is a perspective view as viewed in the direction A shown in FIG. 2. On the engine case 12, a wall portion 12a which endlessly surrounds the shift spindle 50 and the shift mechanism 52 is integrally formed. A shift cover 54 which defines the operation chamber 53 for housing a portion of the shift spindle 50 and the shift mechanism 52 between the shift cover 54 and the engine case 12 is fastened to the wall portion 12a using a plurality of bolts 55. The shift spindle 50 is rotatably supported on the engine case 12 and the shift cover 54 in a state that one end of the shift spindle 50 projects from the shift cover 54. A gear cover 57 is mounted on the shift cover 54 using bolts 58. The gear cover 57 covers a portion of the shift cover 54 so as to form a gear chamber 56 between the gear cover 57 and the shift cover 54.

Figure 4:
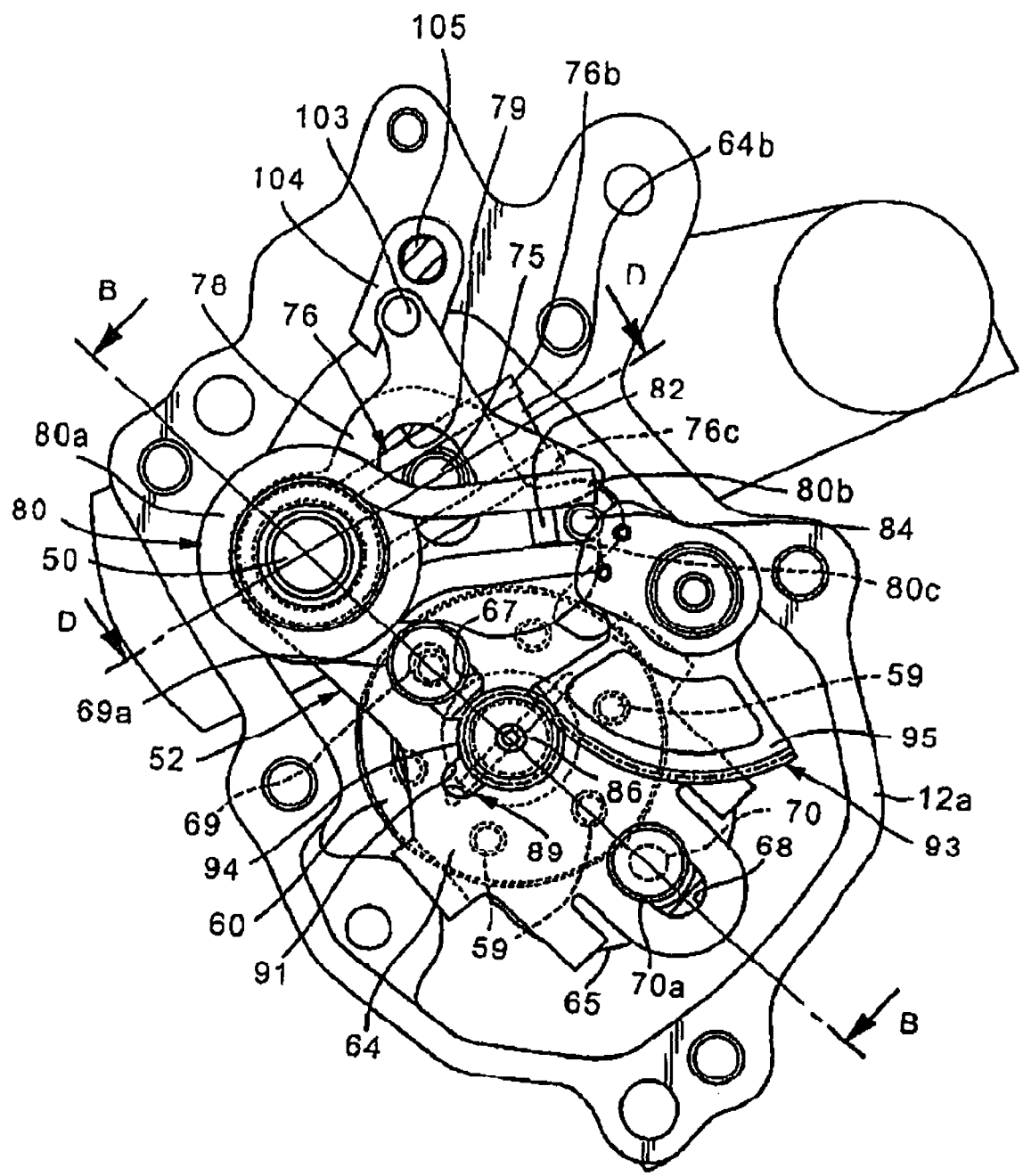
FIG. 4 is a view as viewed in the direction C in FIG. 2 in a state that a shift cover and a gear cover are removed.
Figure 5:
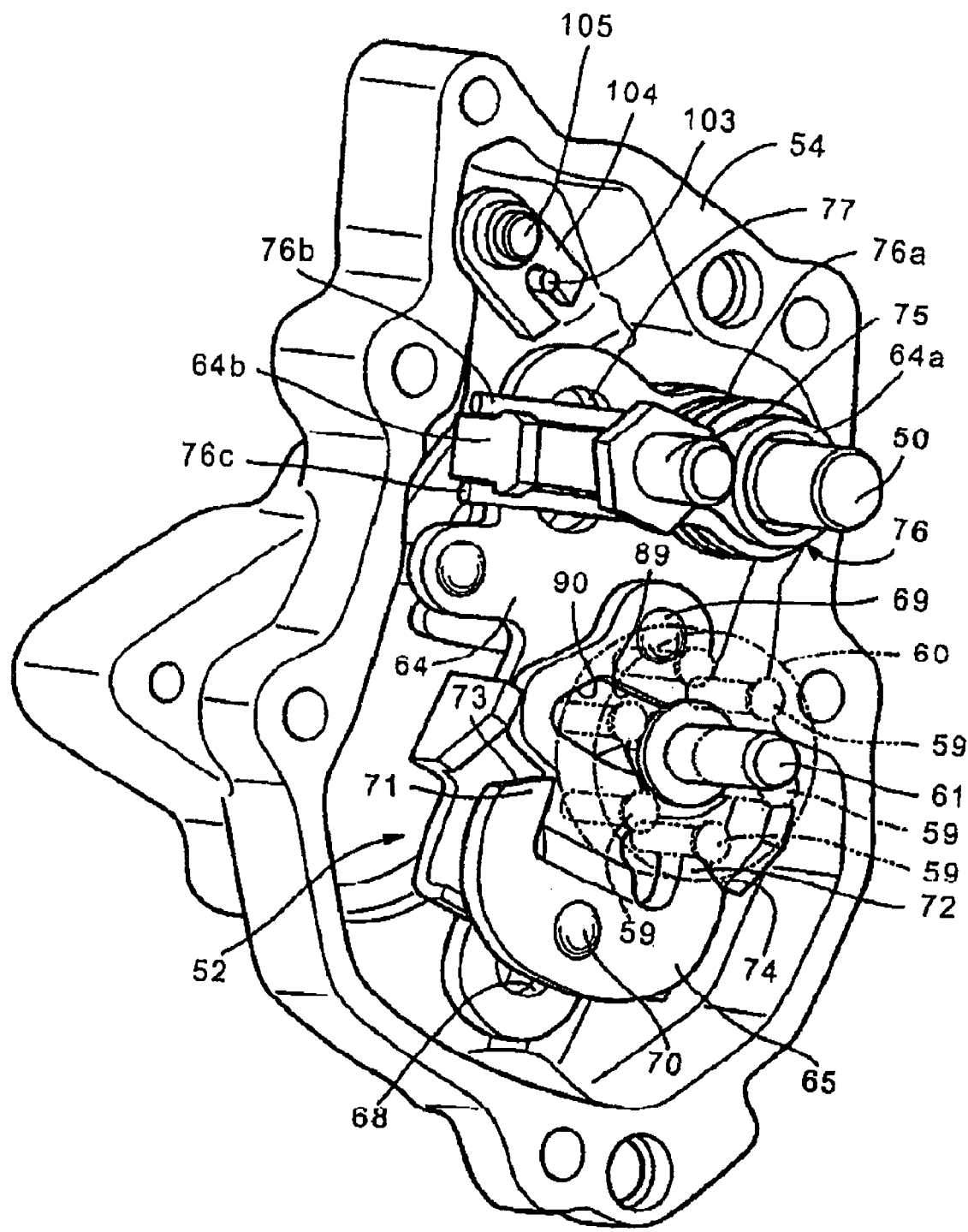
FIG. 5 is a perspective view of the shift cover as viewed from the inside of an engine case.
Figure 6:
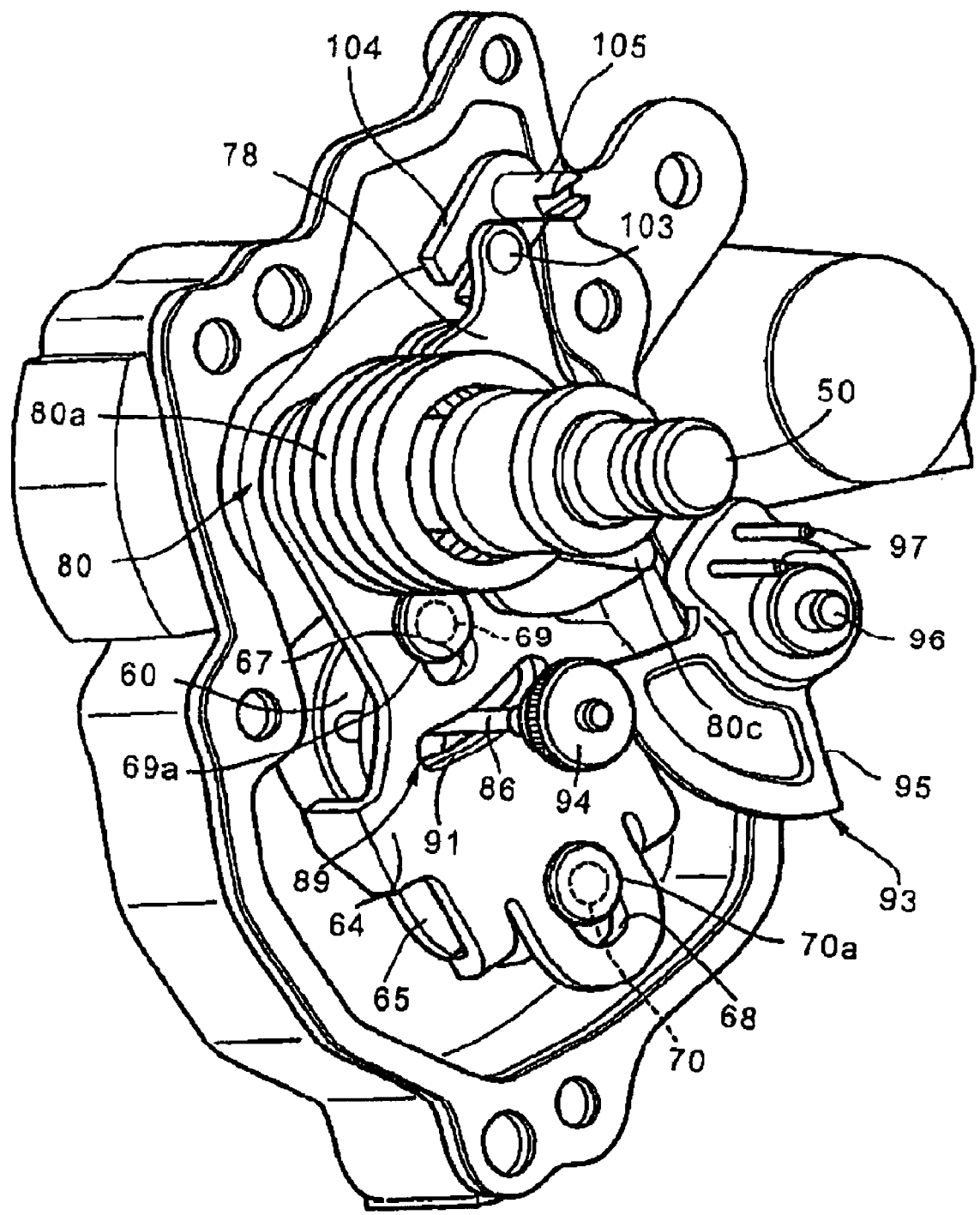
FIG. 6 is a perspective view of the shift mechanism as viewed from the outside of the engine case in a state that the shift cover and the gear cover are removed.
Figure 7:
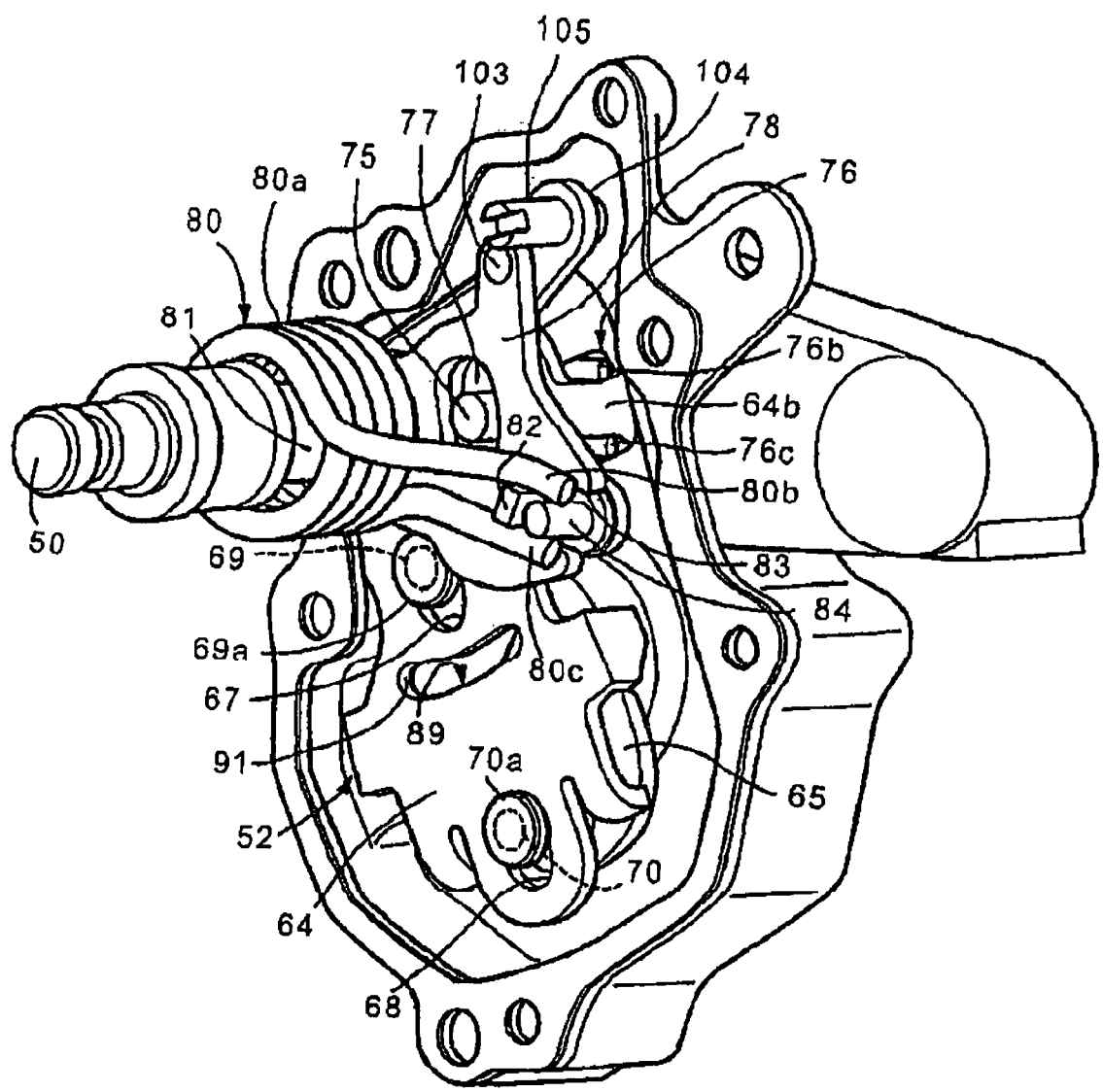
FIG. 7 is a perspective view of the shift mechanism as viewed from the direction different from the direction shown in FIG. 6 in a state that a speed reduction mechanism is removed
Figure 8:
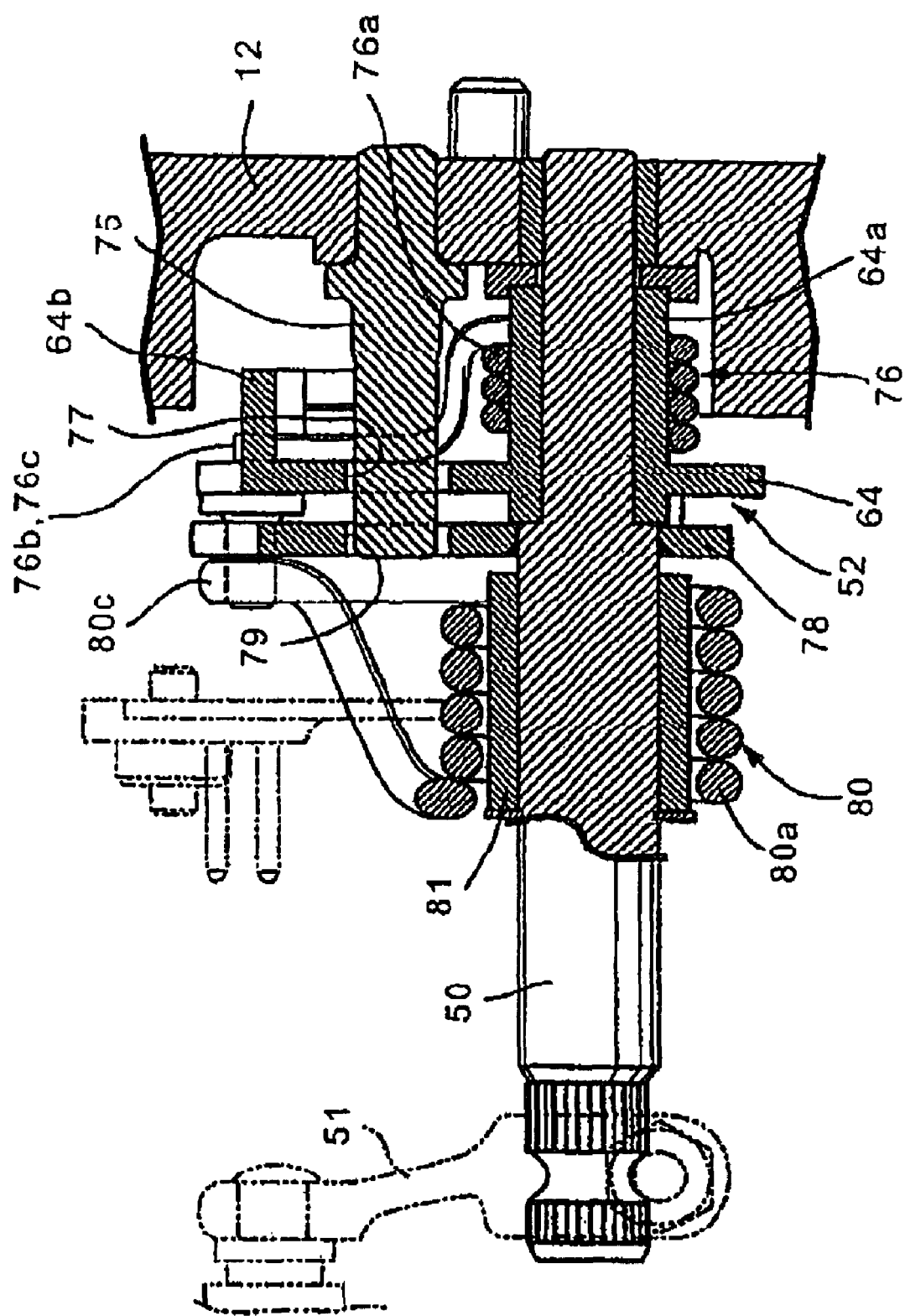
FIG. 8 is a cross-sectional view taken along a line D-D in FIG. 4.

The shift control device of a transmission is further explained also in conjunction with FIG. 4 to FIG. 8. FIG. 4 is a view as viewed in the direction C in FIG. 2 in a state that the shift cover 54 and the gear cover 57 are removed. FIG. 5 is a perspective view of the shift cover 54 as viewed from the inside of the engine case 12. FIG. 6 is a perspective view of the shift mechanism as viewed from the outside of the engine case 12 in a state that the shift cover 54 and the gear cover 57 are removed. Further, FIG. 7 is a perspective view of the shift mechanism as viewed from an opposite direction from the direction shown in FIG. 6 in a state that a speed reduction mechanism is removed. Further, FIG. 8 is a cross-sectional view taken along a line D-D in FIG. 4.

The shift mechanism 52 is constituted of a master arm 64 which has one end portion thereof rotatably supported on the shift spindle 50, an arm 65 which is supported on the master arm 64 in a slidable manner in the predetermined direction, and a first return spring 66 which biases the arm 65 in the direction that the arm 65 approaches the shift spindle 50.

A cylindrical support sleeve 64a which surrounds the shift spindle 50 therein is mounted on one end portion of the master arm 64, and the support sleeve 64a is rotatably supported on the shift spindle 50. Further, in the master arm 64, at positions spaced apart from each other on a straight line which connects a rotational axis of the shift spindle 50 and a rotational axis of the shift drum 42 with each other (in the same direction as a cross-sectional line B-B in FIG. 4), elongated guide holes 67, 68 which extend linearly are formed. On the other hand, one end of pins 69, 70 which respectively penetrate the guide holes 67, 68 are fixed to the arm 65, and flange portions 69a, 70a which are brought into slide contact with a surface of the master arm 64 are formed on the other end portions of the pins 69, 70. Due to such constitution, the arm 65 is slidably supported within a range that the pins 69, 70 are movable in the inside of the guide holes 67, 68. Further, the first return spring 66 which is arranged to surround the pin 70 has both end portions thereof engaged with end portions of the master arm 64 and hence, it is possible to generate a resilient repulsive force which biases the arm 65 in the direction that the arm 65 approaches the shift spindle 50.

A pair of engaging pawls 71, 72 which is mounted on the arm 65 (see FIG. 5) is, when the arm 65 is arranged at a position where the arm 65 is arranged closest to the shift spindle 50 due to a spring force of the first return spring 66, engaged with two neighboring driven pins 59 out of the six driven pins 59 mounted on the shift cam 60 from the outside in a state that the engaging pawls 71, 72 sandwich two neighboring driven pins 59. In such a state, when the master arm 64 is rotated using the shift spindle 50 as the rotational axis, one of the engaging pawls 71, 72 is engaged with one driven pin 59 from the outside and rotatably drives the shift cam 60. That is, the shift drum 42 is rotated.

Further, the engaging pawls 71, 72 are provided with inclined surfaces 73, 74. These inclined surfaces 73, 74 are inclined in the direction to be gradually distanced from the rotational axis of the shift cam 60 in the direction to the outside from the axis of the shift cam 60. Further, when the arm 65 returns to a neutral position together with the master arm 64, after the shift drum 42 is rotatably driven by one of the engaging pawls 71, 72, for example, by the engaging pawl 71 by a predetermined rotational quantity, the inclined surface 73 is brought into contact with the driven pin 59 next to the driven pin 59 with which the engaging pawl 71 is engaged at the time of shift gear operation. Here, the arm 65 which is slidably supported on the master arm 64 is allowed to slide in the direction away from the driven pin 59, since the inclined surface 73 is brought into contact with the driven pin 59. Accordingly, the engaging pawl 71 gets over the driven pin 59 and hence, the master arm 64 and the arm 65 return to a neutral position. Here, the arm 65, at a point of time that the engaging pawl 71 gets over the driven pin 59, returns to an original position due to a resilient repulsive force of the first return spring 66. In the same manner, when the master arm 64 and the arm 65 return to original positions after the shift drum 42 is rotatably driven by the engaging pawl 72, the inclined surface 74 is brought into contact with the driven pin 59 and hence, the arm 65 is allowed to slide and the engaging pawl 72 gets over the driven pin 59.

Further, in the master arm 64, at a position in the vicinity of the shift spindle 50, an arcuate restricting hole 77 (see FIG. 7) is formed about an axis of the shift spindle 50. A stopper pin 75 which is mounted on the engine case 12 is inserted into the restricting hole 77. Due to such constitution, a rotation range of the master arm 64 using the shift spindle 50 as the rotary shaft is restricted due to the contact of the stopper pin 75 with an inner wall portion of the restricting hole 77.

The master arm 64 is biased in the direction that the master arm 64 is made to return to the neutral position by the second return spring 76 (see FIG. 5 and FIG. 8). The second return spring 76 is configured such that the sandwiching portions 76b, 76c, which sandwich the stopper pin 75 from both sides, are mounted on both ends of a coil portion 76a, which is wound around a support sleeve 64a mounted on the master arm 64. End portions of the sandwiching portions 76b, 76c sandwich a engaging portion 64b mounted on an end portion of the master arm 64 in an erected manner together with the stopper pin 75.

Further, when the master arm 64 is rotated along with the shift operation, one of the sandwiching portions 76b, 76c are brought into contact with the stopper pin 75 and, at the same time, the engaging portion 64b deflects another of the sandwiching portions 76b, 76c in the direction away from the stopper pin 75. Accordingly, a resilient repulsive force which returns the master arm 64 to the neutral position is generated.

Further, to the shift spindle 50, a rotational member 78 is fixed. The rotational member 78 is provided for realizing a lost motion function of temporarily absorbing a rotation quantity of the shift spindle 50 when the shift spindle 50 is rotated in a state that the shift drum 42 is not rotatable. An arcuate restricting hole 79 (see FIG. 8) is formed in the rotational member 78 about the rotational axis of the shift spindle 50 and the stopper pin 75 is inserted into the restricting hole 79.

Between the rotational member 78 and the master arm 64, a lost motion spring 80 is provided. The lost motion spring 80 is configured such that sandwiching portions 80b, 80c, which sandwich a pushing portion 82 mounted on the rotational member 78 in an erected manner from both sides are mounted on both ends of a coil portion 80a which is wound around a cylindrical sleeve 81 into which the shift spindle 50 is inserted. A pin 84 which constitutes a pressure receiving portion sandwiched between the sandwiching portions 80b, 80c is mounted on the master arm 64. Here, the pushing portion 82 is formed of a portion of an outer peripheral end of the rotational member 78 which is cut and raised for forming a recessed portion 83 (see FIG. 7) where the pin 84 is arranged.

When the rotational member 78 is rotated along with the shift operation, the pushing portion 82 is brought into contact with one of the sandwiching portions 80b, 80c of the lost motion spring 80 and, at the same time, the other of the sandwiching portions 80b, 80c is brought into contact with the pin 84. When the clutch 6 is in a power transmission state and the rotation of the shift drum 42 is restricted, the rotation of the master arm 64 is also restricted and hence, the rotational member 78 is rotated while leaving the master arm 64 so as to increase a sandwiching angle between the sandwiching portions 80b, 80c. Accordingly, a resilient repulsive force which acts in the direction along which an opening angle is decreased is generated between the master arm 64 and the rotational member 78.

For example, in performing the shift operation in a state that the rotation of the shift drum 42 is restricted, when the shift operation is interrupted in the course of the shift operation, the shift pedal returns to the neutral position due to a resilient repulsive force of the lost motion spring 80. Further, when the shift drum 42 assumes a rotatable state during the continued shift operation, the master arm 64 (shift drum 42) is rotated in the predetermined speed change direction due to the resilient repulsive force. With the use of this lost motion mechanism, even when a large shift pedal operational force is inputted in a state that the rotation of the shift drum 42 is restricted, it is possible to absorb a portion of the operational force by the lost motion spring 80.

On one end portion of the shift drum 42 and on the rotational axis of the shift drum 42, a member to be detected 86 (see FIG. 2 and FIG. 6) is arranged for detecting a rotational quantity of the shift drum 42 using the gear position sensor 92. An engaging pin 87 is inserted into one end portion of the member to be detected 86 in the direction orthogonal to the rotational axis thereof, and a fitting groove 88 in which both end portions of the engaging pin 87 are fitted is formed in the shift cam 60. Due to such constitution, the member to be detected 86 is rotated along with the rotation of the shift cam 60.

On the other hand, the other end portion of the member to be detected 86 is inserted into an opening portion 89 which communicates with the above-mentioned master arm 64 and arm 65. The opening portion 89 is constituted of a first penetration hole 90 formed on the arm 65 side (see FIG. 5) and a second penetration hole 91 formed on the master arm 64 side (see FIG. 6). The first penetration hole 90 is formed in a shape which prevents the arm 65 from being in contact with the member to be detected 86 when the arm 65 is rotated together with the master arm 64 or when the arm 65 is slidably operated relative to the master arm 64. Further, the second penetration hole 91 is formed in a shape which prevents the master arm 64 from being in contact with the member to be detected 86 when the master arm 64 is rotated. In this embodiment, by forming the member to be detected 86 in a rod shape having a smaller diameter compared to the shift drum 42, it is possible to reduce an area of the opening portion 89 thus miniaturizing the shift mechanism 52.

To further explain the shift control device of a transmission in conjunction with FIG. 2, to the wall portion 12*a* of the engine case 12, the shift cover 54 which forms the operation chamber 53 for housing the shift mechanism 52 and the like therein is fastened. One end portion of the member to be detected 86 is inserted into the gear chamber 56 after penetrating the shift cover 54 and, at the same time, is rotatably and pivotally supported on an inner wall portion of the gear cover 57 which is fastened to the shift cover 54 and in which the gear chamber 56 is formed.

The gear position sensor 92 which detects a shift gear position by detecting a rotational quantity of the member to be detected 86, that is, the rotational quantity of the shift drum, is mounted on an outer surface side of the gear cover 57. Between the member to be detected 86 and the gear position sensor 92, there is provided a speed reduction mechanism 93 which transmits the rotational quantity of member to be detected 86 to the gear position sensor 92 after reducing the rotational quantity speed. The speed reduction mechanism 93 is housed in the gear chamber 56.

The speed reduction mechanism 93 is constituted of a drive gear 94 fixed to an end portion of the member to be detected 86 and a sector gear (see FIG. 6) which is meshed with the drive gear 94. The sector gear 95 is rotatably supported on the shift cover 54 by way of a support shaft 96 arranged parallel to the member to be detected 86. Two engaging pins 97 are mounted on the sector gear 95 at positions offset from the support shaft 96. The gear position sensor 92, based on a drive quantity of the sensor detection portion (not shown in the drawing) which is driven while being sandwiched by the engaging pins 97, detects a rotational quantity of the shift drum 42. In this embodiment, with the use of the speed reduction mechanism 93, even when a sensor having a relatively small detection range is used as the gear position sensor 92, the gear position sensor 92 can accurately detect the shift gear position. Here, a sensor case 98 of the gear position sensor 92 is fastened to the gear cover 57 using two bolts 99.

Further, due to the arrangement structure of the gear position sensor 92 described above, the gear position sensor 92 can be arranged outside the engine case 12 without adding a large design change to the engine case 12, the shift mechanism 52 or the like. Further, in this embodiment, it is possible to remove the gear position sensor 92 without disassembling the engine case 12 thus enhancing maintainability. Further, the gear position sensor 92 is fixed to the gear cover 57 which is mounted further outside the shift cover 54 and hence, heat generated by the engine is hardly transmitted to the gear position sensor 92.

On the shift cover 54, the shift spindle rotational quantity sensor 100 which detects a rotational quantity of the shift spindle 50 based on a rotational quantity of the rotational member 78 is mounted. The shift spindle rotational quantity sensor 100 is provided for detecting a rotational quantity of an operation member 104 which has one end side thereof engaged with a pin 103 mounted on the rotational member 78. To a detection portion of the shift spindle rotational quantity sensor 100 (not shown in the drawing), a rotational shaft 105 mounted on the other end side of the operation member 104 is connected. Here, a case 101 of the shift spindle rotational quantity sensor 100 is fastened to the shift cover 54 using two screws 102.

As described above, the motor 21 of the hydraulic modulator 20 is controlled by the ECU 120. A rotational quantity of the shift drum 42, which is detected by the gear position sensor 92, and a rotational quantity of the rotational member 78, which is detected by the shift spindle rotational quantity sensor 100, are inputted to the ECU 120. The ECU 120 calculates an opening angle between the master arm 64 and the rotational member 78 based on the rotational quantity of the shift drum 42 and the rotational quantity of the shift spindle 50. Here, the ECU 120 can calculate an operational force which is inputted to the shift spindle 50, that is, a shift pedal operational force based on the opening angle and a spring constant of the lost motion spring 80. Accordingly, without using particular equipment such as a load sensor, it is possible to estimate and detect the shift pedal operational force based on the values detected by two potentiometers. Here, an operational force detection means of a shift pedal is constituted of the gear position sensor 92 and the shift spindle rotational quantity sensor 100.

Figure 9:
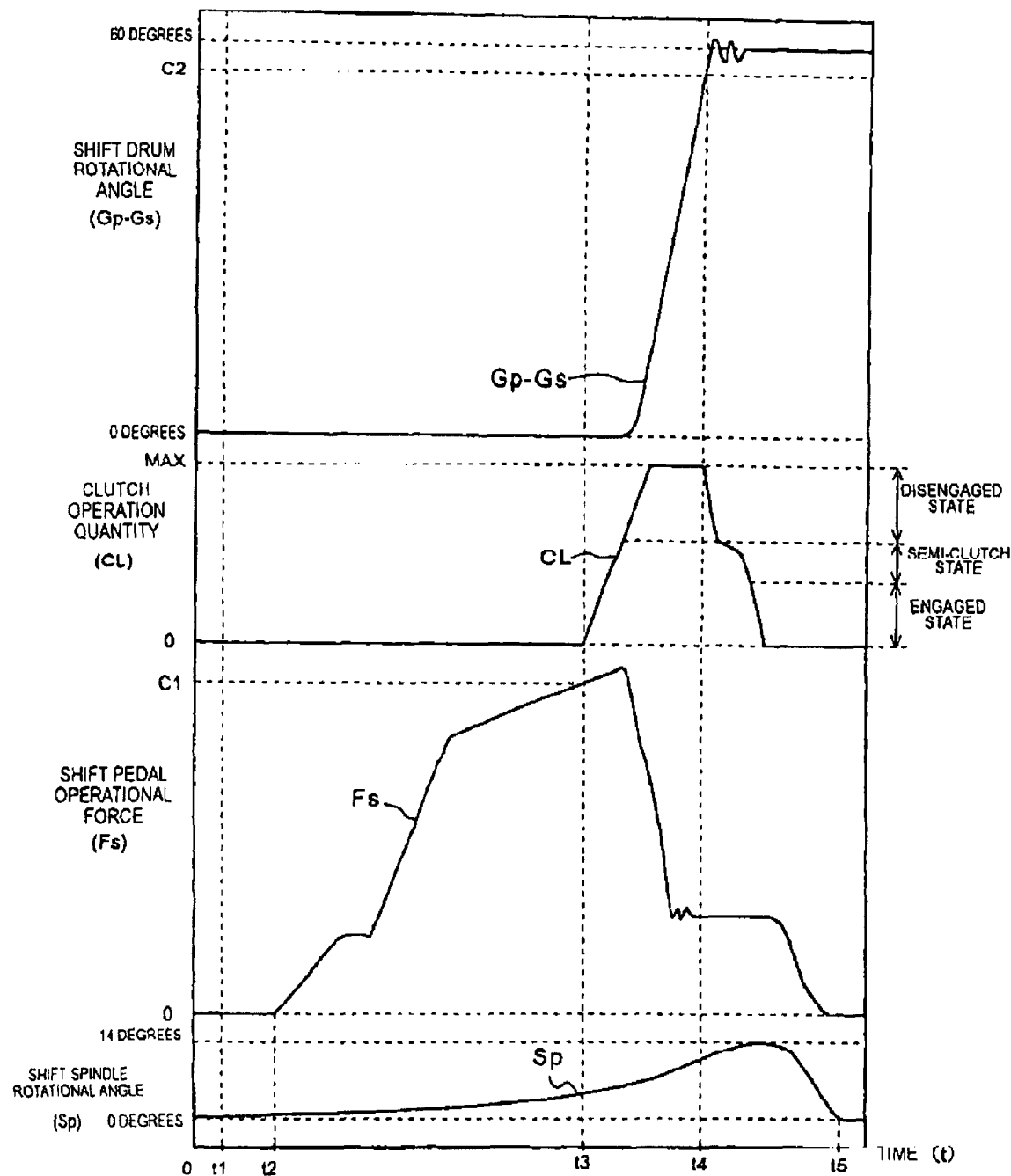
FIG. 9 is a graph showing various states at the time of performing a clutch control which is executed by the shift control device of the transmission of the embodiment according to the present invention.

FIG. 9 is a graph showing various states of a clutch control executed by the shift control device of the transmission according to this embodiment. In the speed change mechanism 10 according to this embodiment, the shift drum 42 is configured such that, every time a shift-up operation or a shift-down operation is executed, the shift drum 42 is intermittently rotated by 60 degrees in one direction or in the direction opposite to such one direction. A shift drum rotational angle (Gp−Gs) in the graph is expressed as a difference between a present shift drum angle (Gp) from an initial angle and a shift drum angle before a shift gear operation (Gs) from the initial angle. Further, a clutch operation quantity (CL) is calculated based on a value detected by the oil pressure sensor 118 of the hydraulic modulator 20 or a value detected by the tilting member rotational quantity sensor 117. The clutch operation quantity (CL) is also a value corresponding to a slide quantity of the clutch inner of the clutch 6. Further, the shift pedal operational force (Fs) is, as described above, a value which is detected by estimation based on the gear position sensor 93 and the shift spindle rotational quantity sensor 100. Further, a shift spindle rotational angle (Sp) is a value detected by the shift spindle rotational quantity sensor 100. Here, with respect to the shift spindle 50 according to the present embodiment, a maximum rotational quantity from a neutral position at the time of gear change operation is set to 14 degrees.

The shift control device of the transmission according to this embodiment is characterized in that, when starting of the shift operation is detected by the shift operation starting detection means 130 in the ECU 120, the motor 21 of the hydraulic modulator 20 is driven so as to disengage the clutch 6, while when the completion of the shift change is detected by the shift change completion detection means 131, the motor 21 of the hydraulic modulator 20 is driven so as to engage the clutch 6. Then, the shift operation starting detection means 130 is configured to detect starting of the shift operation when it is determined that the shift pedal operational force (Fs) detected by the operation a force detection means (gear position sensor 92 and shift spindle rotational quantity sensor 100) becomes equal to or more than a first threshold value C1 which constitutes a scheduled operational force. Further, the shift change completion detection means 131 is configured to detect the completion of shift change when it is determined that the shift drum rotational angle (Gp–Gs) detected by the rotational angle detection means (gear position sensor 92) becomes equal to or more than a second threshold value C2 which constitutes a first scheduled angle. Here, the determination whether or not the shift pedal operational force becomes equal to or more than the first threshold value C1 and the determination whether or not the shift drum rotational angle becomes equal to or more than the second threshold value C2 are respectively executed by determination means (not shown in the drawing) in the ECU 120.

The above-mentioned operations are confirmed by reference to a graph. This graph, for example, corresponds to a flow at the time of shifting up the shift gear position to the fourth speed position during acceleration in a state that the third speed position is selected. First of all, even when the operation of the shift pedal is started at a point of time t1, the clutch 6 is engaged so as to transmit the rotational drive force of the engine and hence, the shift drum 42 cannot be rotated. Accordingly, along with the operation of the shift pedal, only the shift spindle 50 begins to rotate. Then, from a point of time t2, an opening angle of the lost motion spring 80 begins to increase and, accordingly, a value of the shift pedal operational force (Fs) begins to increase.

Then, the ECU 120 determines that the shift operation is started, that is, a rider has an intention of changing a speed at a point of time t3 that the shift pedal operational force (Fs) becomes equal to or more than the first threshold value C1, and drives the motor 21 of the hydraulic modulator 20 so as to start driving of the clutch 6 in the disengaging direction. When the disengagement of the clutch 6 is started, the shift drum 42 begins to rotate and hence, the shift drum rotational angle (Gp–Gs) begins to increase. The shift pedal operational force Fs, along with starting of the rotation of the shift drum 42, reaches the first threshold value C1 at a point of time t3 and thereafter overshoots slightly, and decreases after such overshooting.

On the other hand, at a point of time t4, the shift drum rotational angle (Gp–Gs) becomes equal to or more than the second threshold value C2 which is smaller than 60 degrees (for example, 55 degrees). Accordingly, the ECU 120 determines that the shift change is completed and begins to drive the clutch 6 in the engaging direction. By starting the engagement of the clutch 6, the clutch operation quantity (CL) returns to a full engagement state by way of a disengagement range and a semi-clutch range. Here, this embodiment adopts a control which alleviates a shock at the time of clutch engagement by decreasing an oil pressure which acts on the above-mentioned clutch slave cylinder 8 when the clutch operation quantity enters the semi-clutch range.

Further, the shift pedal operational force (Fs) rapidly decreases due to starting of rotation of the shift drum and, thereafter, returns to zero due to decreasing of the operational force applied to the shift pedal by the rider. Along with such an operation, the shift spindle rotational angle (Sp) returns to the initial position at point of time t5.

Figure 10:
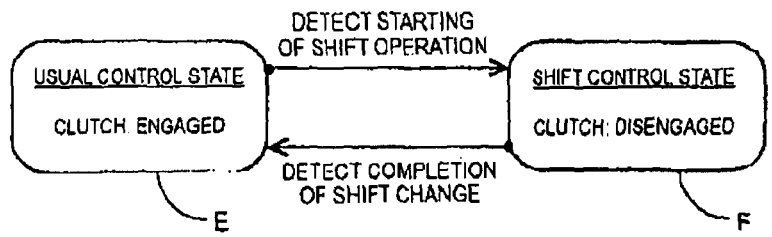
FIG. 10 is a state transition chart showing the constitution of the clutch control.

FIG. 10 is a state transition chart showing the constitution of the clutch control according to this embodiment. As control states of the clutch 6 (hereinafter, also simply referred to as the clutch), a usual control state E in which the clutch is engaged and a shift control state F in which the clutch is disengaged are set. Then, upon detection of starting of shift operation when the clutch 6 is in the usual control state E, the clutch state is transferred to the shift control state F. On the other hand, upon detection of completion of the shift change when the clutch state is in the shift control state F, the clutch state is transferred to the usual control state E.

Figure 11:
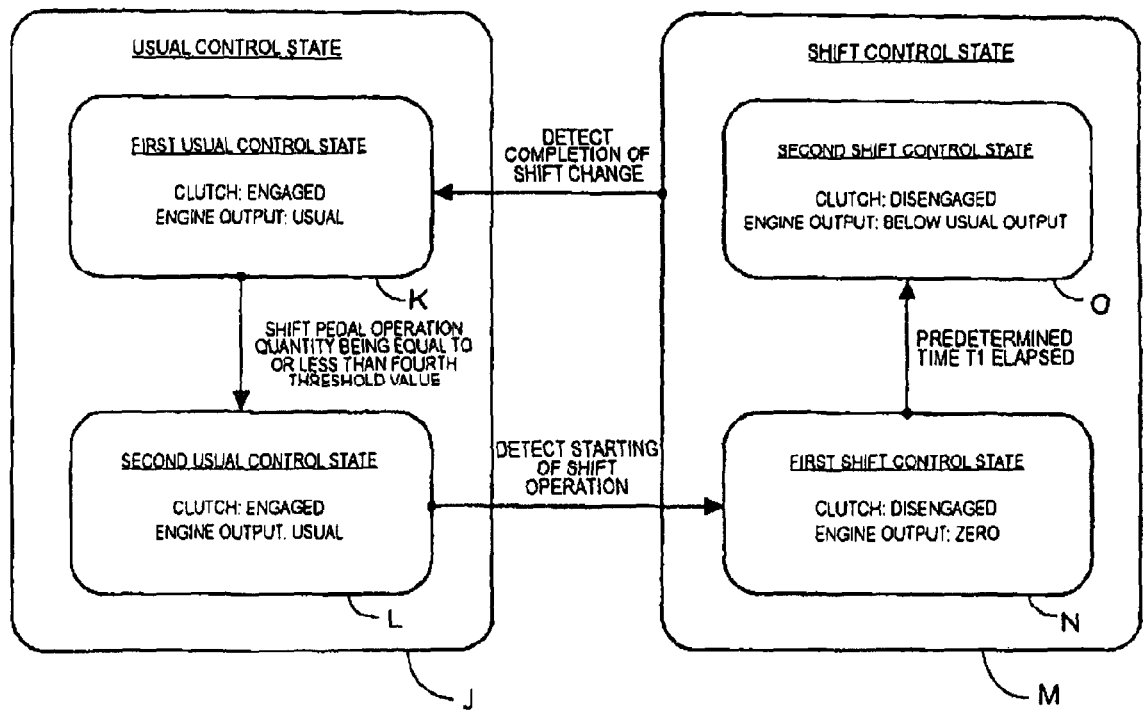
FIG. 11 is a state transition chart showing the constitution of a clutch control according to a modification of the embodiment of the present invention.

FIG. 11 is a state transition chart showing the constitution of the clutch control according to a modification of one embodiment of the present invention. As usual control states J in this modification, a first usual control state K in which the clutch is engaged and the engine output is a usual output and a second usual control state L in which the clutch is engaged and the engine output is the usual output are set. The first usual control state K and the second usual control state L execute the same control with respect to the clutch and the engine output. Further, as shift control states M, a first shift control state N in which the clutch is disengaged and the engine output is approximately zero and a second shift control state O in which the clutch is disengaged and the engine output is equal to the usual output or less are set.

The ECU 120 determines, during usual driving in which no shift gear operation is performed, ignition timing by applying a detection signal from the throttle opening sensor 113, the engine rotational speed sensor 115 or the like to an ignition map constituted of a three-dimensional map or the like stored in the ECU 120, and drives the ignition device 111. Then, the ECU 120 cuts the ignition by the ignition device 111 arbitrary number of times with respect to the usual engine output obtained by executing the ignition based on the ignition map and hence, it is possible to instantaneously reduce the engine output to be below the usual output or to control the engine output to approximately zero.

In this modification, the clutch state is performed such that, upon detection of starting of the shift operation when the clutch state is in the second usual control state L, the second usual control state L is transferred to the first shift control state N. Further, with a lapse of predetermined time T1 after the clutch state is transferred to the first shift control state N, the first shift control state N is transferred to a second shift control state O. Then, upon detection of the completion of the shift change when the clutch state is in the first shift control state N or second shift control state O, the clutch state is transferred to the first usual control state K. In the first usual control state K, even when starting of the shift operation is detected, the clutch state is not transferred to the first shift control state N. When it is determined that the operation quantity of the shift pedal becomes equal to or less than a fourth threshold value C4 which constitutes a scheduled operation quantity when the clutch state in the first usual control state K, the clutch state is transferred to the second usual control state L where the clutch state can transfer to the first shift control state N. Here, the operation quantity of the shift pedal is detected by the shift spindle rotational angle sensor 100.

According to the setting of the clutch control as described above, unless the operation quantity of the shift pedal is equal to or less than the fourth threshold value C4, the clutch state is not transferred to the second usual control state L where the disengagement of the clutch is permitted. Accordingly, by setting the fourth threshold value C4 to a small value, after completion of the shift change, the subsequent shift operation is not permitted unless the shift pedal returns to a state where the shift pedal is closer to the initial position before the shift operation. Accordingly, it is possible to surely perform the shift change which follows an intention of a rider to change a speed. Here, the determination whether or not the operation quantity of the shift pedal becomes the fourth threshold value C4 or less can be executed before the detection of the completion of the shift change. Due to such an operation, when the operation quantity of the shift pedal becomes equal to or less than the fourth threshold value before the detection of the completion of the shift change, simultaneously with the detection of the completion of the shift change, the clutch state is transferred to the second usual control state L via the first usual control state K.

Further, by executing the control which limits the engine output as described previously, the shift change can be performed more smoothly thus enhancing shift feeling of a rider. To be more specific, upon detection of starting of the shift operation, first of all, the engine output is set to approximately zero in the first shift control state N, thus easing the release of engagement of the dog clutches between the speed change gears. Subsequently, by setting the engine output to a usual value or less in the second shift control state O, it is possible to prevent the elevation of the engine rotational speed during disengagement of the clutch.

Figure 12:
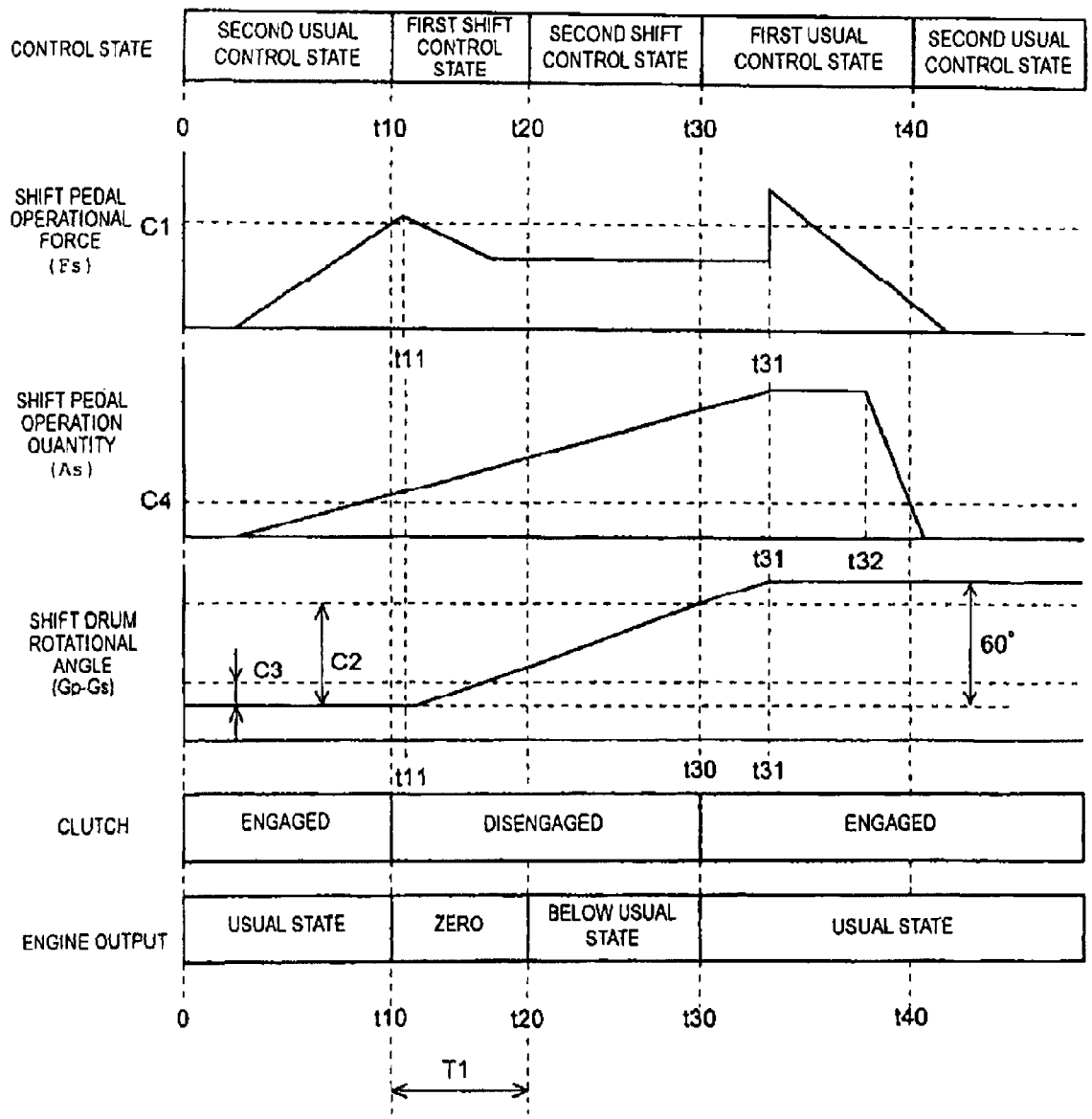
FIG. 12 is a graph showing various states at the time of executing a shift gear operation based on the clutch control shown in FIG. 11.

FIG. 12 is a graph showing various states at the time of executing the shift gear operation in accordance with the clutch control shown in FIG. 11. This graph, in the same manner as the graph shown in FIG. 9, for example, corresponds to a flow at the time of shifting up of the shift gear position to the fourth speed position during acceleration in a state that the third speed position is selected. First of all, the control state is in the second usual control state L during acceleration at the third speed position. When the operation of the shift pedal is started in such a control state, the shift pedal operational force (Fs) begins to increase. Then, when it is determined that the shift pedal operational force (Fs) becomes the first threshold value C1 or more at a point of time t10, the shift operation starting detection means 130 detects starting of the shift operation and hence, the clutch state is transferred to the first shift control state N. Next, when the disengagement of the clutch is started due to the transition of the clutch state into the first shift control state N, the shift drum rotational angle (Gp−Gs) begins to increase at a point of time t11.

Here, in this modification, the shift operation starting detection means 130 is configured to detect starting of the shift operation upon determination that the shift pedal operational force (Fs) becomes equal to or more than the first threshold value C1. However, the shift operation starting detection means 130 may be configured to perform such detection upon determination that the shift drum rotational angle (Gp−Gs) becomes equal to or more than the third threshold value C3 which constitutes a second scheduled angle which is smaller than the above-mentioned second threshold value C2 (first scheduled angle). Due to such detection setting, even when the shift pedal is operated in a state where the shift drum is rotatable without disengaging the clutch such as a case that the power force of the engine is small or the like, starting of the shift operation is detected based on a rotational angle of the shift drum thus enabling execution of a proper clutch control. Here, the determination whether or not an operation quantity of the shift pedal becomes equal to or less than the fourth threshold value C4 and the determination whether or not a shift drum rotational angle becomes equal to or more than the third threshold value are respectively executed by determination means arranged in the ECU 120.

Then, at a point of time t20 that a predetermined time T1 elapses from the transition of the clutch state to the first shift control state N, the ECU 120 shifts the clutch state to the second shift control state O and executes a control to set an engine output to a usual output or less. Subsequently, when it is detected that the shift drum rotational angle (Gp−Gs) becomes equal to or more than the second threshold value C2 at a point of time t30, the ECU 120 determines the completion of the shift change and transfers the clutch state to the first usual control state K. Due to such transition of the clutch state from the second shift control state O to the first usual control state K, the engagement of the clutch is started and, at the same time, the engine output returns to the usual output.

Here, a rotational operation is finished when the shift drum rotational angle (Gp−Gs) becomes 60 degrees which is a predetermined rotational angle at a point of time t31. At a point of time t31, the shift pedal operational force (Fs) is rapidly elevated due to stopping of the rotational operation of the shift drum 42 and, thereafter, is gradually decreased along with an operation of a rider who recognizes the completion of the shift change to decrease an operational force applied to the shift pedal. Further, the shift pedal operation quantity (As) reaches an upper limit value at a point of time t31 and, thereafter, the shift pedal operation quantity (As) begins to decrease upon reaching a point of time t32 when the shift pedal operational force (Fs) falls below a resilient repulsive force of the second return spring 76 (see FIG. 5) which returns the master arm 64 to a neutral position.

Then, the ECU 120, when the shift pedal operation quantity (As) becomes equal to or less than the fourth threshold value C4, executes the transition of the clutch state to the second usual control state L where the clutch state can transfer to the first shift control state L. Due to such transition of the clutch state to the second usual control state L, the clutch state becomes ready for accepting the next shift change. Here, it must be noted that the state of the shift pedal operational force (Fs), the state of the shift pedal operation quantity (As) and the state of the shift drum rotational angle (Gp−Gs) are changed depending on the manner of the pedal operation by a rider and hence, a graph having the same shape as the graph shown in FIG. 12 is not reproduced for every shift gear operation.

Figure 13:
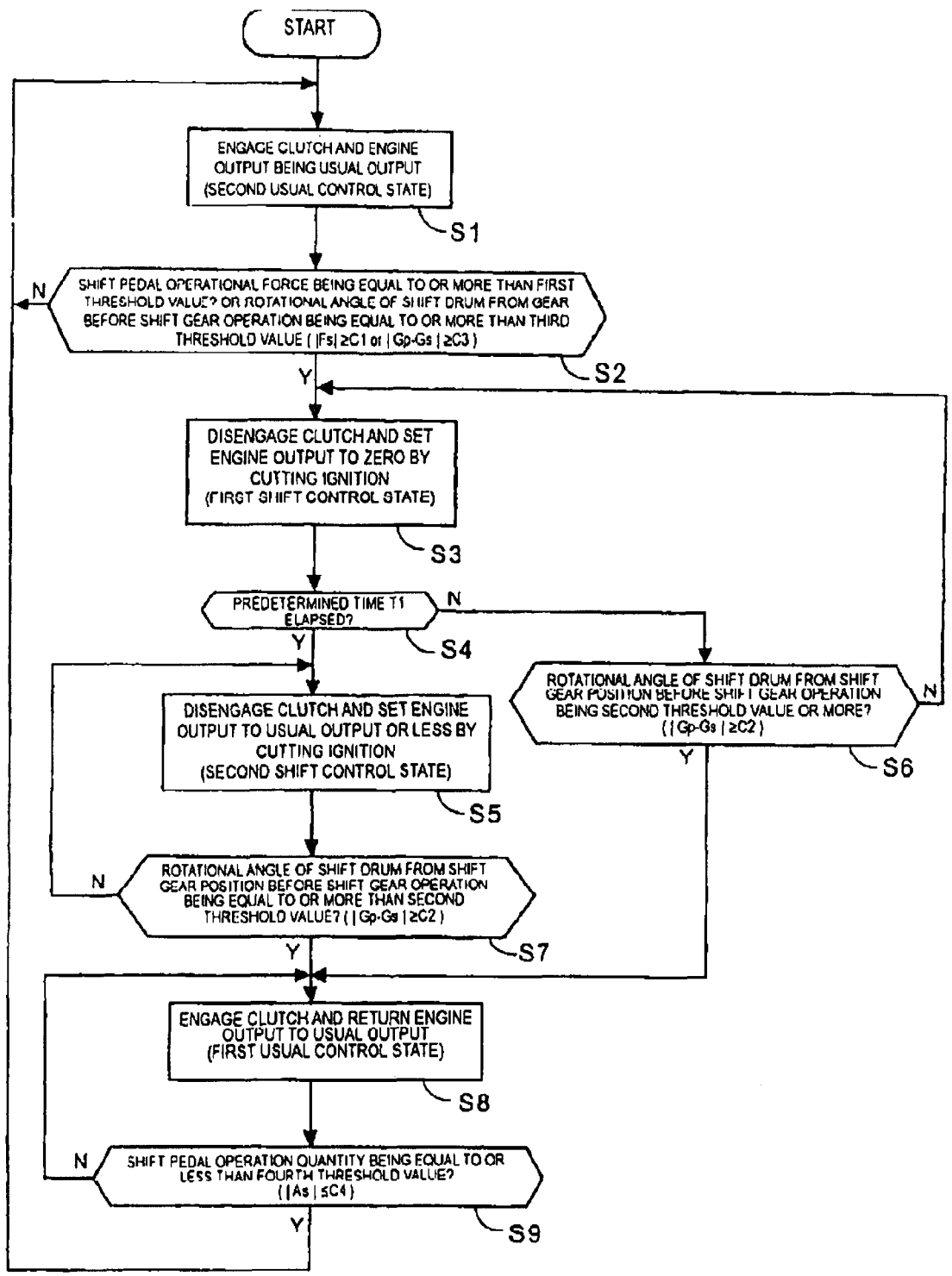
FIG. 13 is a flow chart showing a flow of the clutch control shown in FIG. 12.

FIG. 13 is a flow chart showing a flow of the clutch control shown in FIG. 12. The processing shown in this flow chart is executed by the ECU 120 which constitutes a control means. In step S1, the clutch state assumes a state in which the clutch is engaged and, at the same time, the engine output is the usual output (the second usual control state). The state in which the engine output is the usual output implies a state that the engine generates the usual engine output which can be obtained based on information of engine rotational speed and throttle opening during in-gear traveling. Then, in step S2, it is determined whether or not the operational force of the shift pedal becomes equal to or more than the first threshold value C1 or whether or not the rotational angle of the shift drum before shift gear operation becomes equal to or more than the third threshold value C3. When the determination in step S2 is affirmative, the processing advances to step S3, and the clutch is disengaged and, at the same time, the engine output is set to zero by cutting the ignition (the first shift control state). Here, when the determination in step S2 is negative, it is determined that the rider has no intention of changing the gear and the processing returns to step S1.

In subsequent step S4, it is determined whether or not the predetermined time T1 has elapsed. When the determination is affirmative, the processing advances to step S5 in which the clutch is disengaged and, at the same time, the engine output is set to the usual output or less by cutting the ignition (the second shift control state). Here, it is sufficient that the engine output control in step S3 is performed such that engine output is smaller than the engine output in step S5. For example, the engine output may be controlled to approximately zero which is slightly larger than zero.

In subsequent step S7, it is determined whether or not the rotational angle of the shift drum from the shift gear position before shift gear operation is equal to the second threshold value C2 or more. When the determination is affirmative, the processing advances to step S8. In step S8, the clutch is engaged and, at the same time, the engine output returns to the usual output (the first usual control state). When the determination is negative in step S7, the processing returns to step S5. Here, when the determination is negative in step S4, the processing advances to step S6. In step S6, in the same manner as step S7, it is determined whether or not the rotational angle of the shift drum from the shift gear position before shift gear operation is equal to the second threshold value C2 or more. According to the determination in step S6, even when the predetermined time T1 does not elapse, when the completion of the shift change is detected, the clutch state is changed to the first usual control state. Accordingly, when the determination is affirmative in step S6, the processing advances to step S8, while when the determination is negative, the processing returns to step S3.

In subsequent step S9, it is determined whether or not the operation quantity of the shift pedal becomes equal to or less than the fourth threshold value C4. When the determination in step S9 is negative, the processing returns to step S8. On the other hand, when the determination is affirmative, a series of controls are finished and, again, the clutch state is changed to the second usual control state shown in step S1.

Figure 14:
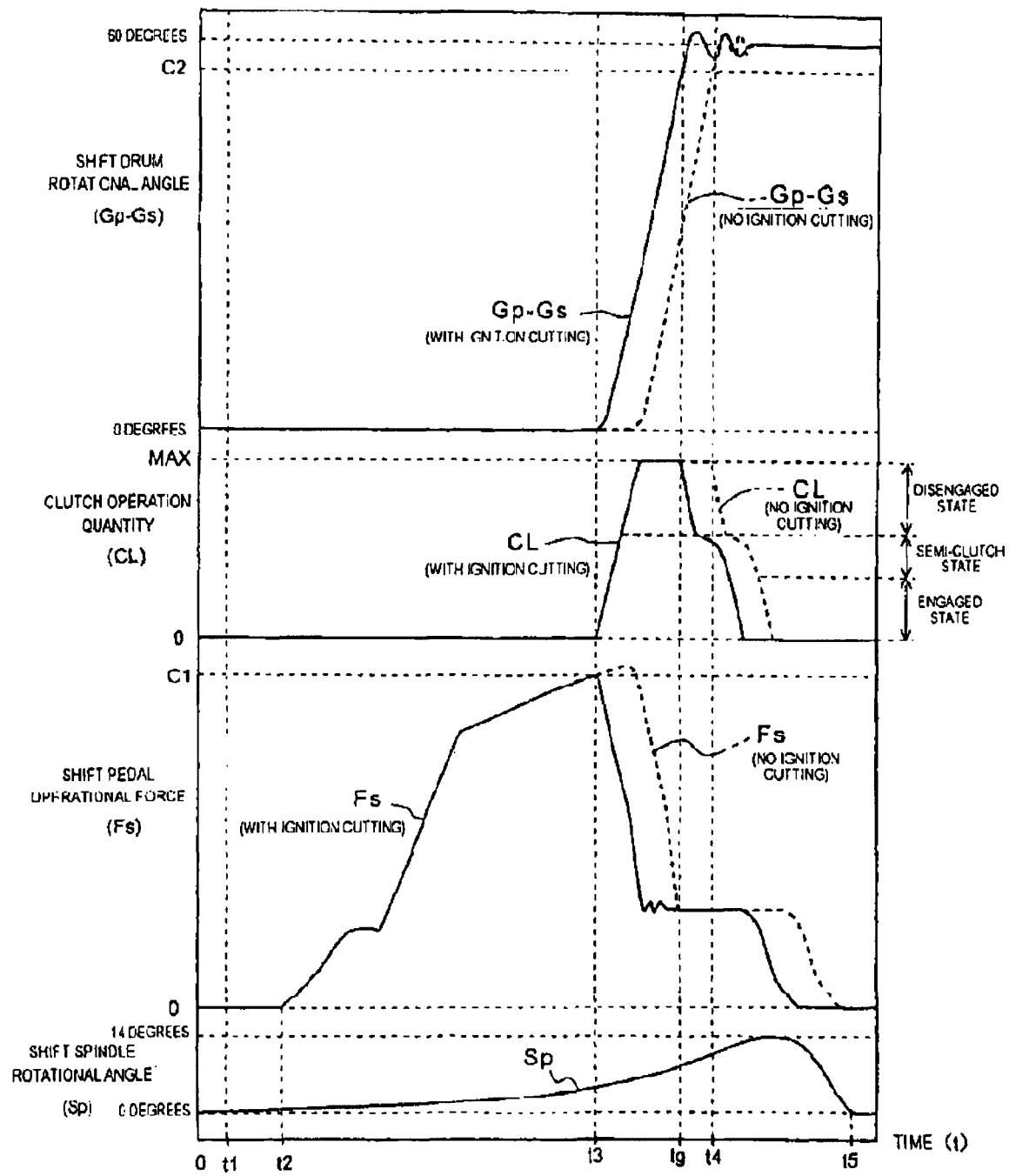
FIG. 14 is a graph showing changes when the engine output control is executed.

FIG. 14 is a graph showing a change of the engine output when the engine output control is performed along with the clutch control shown in FIG. 9. As described above, the engine output control is executed by cutting the ignition in the first shift control state and the second shift control state. For purposes of comparison purpose, respective values on the graph obtained when the cutting of ignition is not executed are indicated by a broken line parallel to the values on the graph obtained when the cutting of ignition is executed.

As shown in this graph, when the cutting of ignition is executed together with the disengagement operation of the clutch, the rotational drive force of the engine can be instantaneously lowered and hence, it is possible to reduce the time until the shift drum begins to rotate. Due to such reduction of time, the time until the shift drum rotational angle reaches the second threshold value C2 or more is also reduced and the timing at which the reengagement of the clutch starts becomes earlier (a point of time tg earlier than a point of time t4). As a result, it is possible to reduce the time necessary for the shift change. Further, since the time from the detection of the shift operation to a point of time that the shift drum begins to rotate is shortened, a period during which an overshoot occurs after the shift pedal operational force (Fs) becomes equal to or more than the first threshold value C1 is shortened and hence, a gear change shock due to a reactional force generated on the shift pedal is reduced, thus enhancing the shift feeling and the drivability.

The arrangement, the constitution and the like of the transmission, the speed change mechanism, the hydraulic modulator, the ECU and the various sensors are not limited to the above-mentioned embodiments and various modifications may be made. Further, the set values of the first to fourth threshold values C1 to C4, the predetermined time T1 and the like may be arbitrarily changed depending on the constitution of the transmission or the like. Further, the control of the engine output is not limited to the cutting of ignition, and the engine output may be controlled by retardation of ignition, cutting of fuel, reduction of fuel quantity, opening/closing of a throttle or the like. Here, the application of the shift control device of the transmission of the present invention is not limited to the above-mentioned motorcycle and the shift control device of the transmission of the present invention is applicable to a three-wheeled vehicle or a four-wheeled vehicle which uses an engine as a power source.

Although a specific form of embodiment of the instant invention has been described above and illustrated in the accompanying drawings in order to be more clearly understood, the above-description is made by way of example and not as a limitation to the scope of the instant invention. It is contemplated that various modifications apparent to one of ordinary skill in the art could be made without departing from the scope of the invention which is to be determined by the following claims.

We claim:

1. A shift control device of a transmission which changes a gear position by intermittently rotating a shift drum in response to an operation of a shift pedal, the shift control device comprising:

a clutch which disengages or engages a drive force transmitted to a drive wheel from an engine;

an actuator which generates power for engaging or disengaging said clutch;

a control means which controls said actuator;

a shift operation initiation detection means which detects initiation of a shift operation in response to the operation of the shift pedal; and a shift change completion detection means which detects the completion of a gear change by the shift operation, wherein said control means disengages said clutch by driving said actuator upon detection of initiation of the shift operation by said shift operation initiation detection means, and engages said clutch by driving said actuator upon detection of completion of the gear change by said shift change completion detection means.

2. A shift control device of a transmission according to claim 1, further comprising:

an operational force detection means which detects an operational force on said shift pedal; and a rotational angle detection means which detects a rotational angle of said shift drum, wherein said shift operation initiation detection means detects initiation of the shift operation upon determination that the operational force on said shift pedal detected by said operational force detection means is equal to or more than a predetermined operational force, and wherein said shift change completion detection means detects the completion of the gear change upon determination that the rotational angle of said shift drum is a first predetermined angle or more relative to the rotational angle of said shift drum prior to the shift operation.

3. A shift control device of a transmission according to claim 2, wherein said shift operation initiation detection means also detects the initiation of the shift operation upon determination that the rotational angle of said shift drum is greater than or equal to a second predetermined angle and less than said first predetermined angle, relative to the rotational angle of said shift drum prior to shift gear operation.

4. A shift control device of a transmission according to claim 1, wherein said control means further comprises an engine control means for controlling an output of said engine, and wherein, upon detection of the initiation of the shift operation, said control means disengages said clutch and transfers a clutch state to a first shift control state in which the output of said engine is approximately zero;

wherein, after a lapse of a predetermined time from the transition to the first shift control state, said control means disengages said clutch and transfers the clutch state to a second shift control state in which the output of said engine is equal to or less than a usual level, and wherein, upon detection of the completion of the gear change after the clutch state is in the first shift control state or in the second shift control state, said control means engages said clutch and transfers the clutch state to a usual control state in which the output of the engine is the usual level.

5. A shift control device of a transmission according to claim 2, wherein said control means further comprises an engine control means for controlling an output of said engine, and wherein, upon detection of the initiation of the shift operation, said control means disengages said clutch and transfers a clutch state to a first shift control state in which the output of said engine is approximately zero;

wherein, after a lapse of a predetermined time from the transition to the first shift control state, said control means disengages said clutch and transfers the clutch state to a second shift control state in which the output of said engine is equal to or less than a usual level, and wherein, upon detection of the completion of the gear change after the clutch state is in the first shift control state or in the second shift control state, said control means engages said clutch and transfers the clutch state to a usual control state in which the output of the engine is the usual level.

6. A shift control device of a transmission according to claim 3, wherein said control means further comprises an engine control means for controlling an output of said engine, and wherein, upon detection of the initiation of the shift operation, said control means disengages said clutch and transfers a clutch state to a first shift control state in which the output of said engine is approximately zero;

wherein, after a lapse of a predetermined time from the transition to the first shift control state, said control means disengages said clutch and transfers the clutch state to a second shift control state in which the output of said engine is equal to or less than a usual level, and wherein, upon detection of the completion of the gear change after the clutch state is in the first shift control state or in the second shift control state, said control means engages said clutch and transfers the clutch state to a usual control state in which the output of the engine is the usual level.

7. A shift control device of a transmission according to claim 4, further comprising a shift pedal operation quantity detection means which detects an operation quantity of said shift pedal, wherein said usual control state comprises a first usual control state in which said clutch cannot transfer to the first shift control state and a second usual control state in which the clutch state can transfer to the first shift control state, and wherein said control means transfers the clutch state to the first usual control state upon detection of the completion of the gear change after the clutch state is in the first shift control state or in the second shift control state, and wherein said control means transfers the clutch state to the second usual control state upon determination that an operation quantity of said shift pedal is equal to or less than a predetermined operation quantity after the clutch state is in the first usual control state.

8. A shift control device of a transmission according to claim 5, further comprising a shift pedal operation quantity detection means which detects an operation quantity of said shift pedal, wherein said usual control state comprises a first usual control state in which said clutch cannot transfer to the first shift control state and a second usual control state in which the clutch state can transfer to the first shift control state, and wherein said control means transfers the clutch state to the first usual control state upon detection of the completion of the gear change after the clutch state is in the first shift control state or in the second shift control state, and wherein said control means transfers the clutch state to the second usual control state upon determination that an operation quantity of said shift pedal is equal to or less than a predetermined operation quantity after the clutch state is in the first usual control state.

9. A shift control device of a transmission according to claim 6, further comprising a shift pedal operation quantity detection means which detects an operation quantity of said shift pedal, wherein said usual control state comprises a first usual control state in which said clutch cannot transfer to the first shift control state and a second usual control state in which the clutch state can transfer to the first shift control state, and wherein said control means transfers the clutch state to the first usual control state upon detection of the completion of the gear change after the clutch state is in the first shift control state or in the second shift control state, and wherein said control means transfers the clutch state to the second usual control state upon determination that an operation quantity of said shift pedal is equal to or less than a predetermined operation quantity after the clutch state is in the first usual control state.

10. A shift control device of a transmission according to claim 1, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

11. A shift control device of a transmission according to claim 2, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

12. A shift control device of a transmission according to claim 3, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

13. A shift control device of a transmission according to claim 4, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

14. A shift control device of a transmission according to claim 5, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

15. A shift control device of a transmission according to claim 6, further comprising
 a lost motion mechanism disposed between said shift drum and a shift spindle connected to said shift pedal, for connecting said shift spindle and said shift drum by way of a resilient member,
 wherein an operational force applied to said shift pedal is detected based on an operation quantity of said lost motion mechanism.

16. A shift control device of a transmission according to claim 7, further comprising
 a lost motion mechanism disposed between said shift drum and a shift spindle connected to said shift pedal, for connecting said shift spindle and said shift drum by way of a resilient member,
 wherein the operational force applied to said shift pedal is detected based on an operation quantity of said lost motion mechanism.

17. A shift control device of a transmission according to claim 8, further comprising
 a lost motion mechanism disposed between said shift drum and a shift spindle connected to said shift pedal, for connecting said shift spindle and said shift drum by way of a resilient member,
 wherein the operational force applied to said shift pedal is detected based on an operation quantity of said lost motion mechanism.

18. A shift control device of a transmission according to claim 9, further comprising
 a lost motion mechanism disposed between said shift drum and a shift spindle connected to said shift pedal, for connecting said shift spindle and said shift drum by way of a resilient member,
 wherein the operational force applied to said shift pedal is detected based on an operation quantity of said lost motion mechanism.

\* \* \* \* \*